(12) United States Patent
Song

(10) Patent No.: US 12,158,694 B2
(45) Date of Patent: Dec. 3, 2024

(54) CAMERA MODULE

(71) Applicant: LG INNOTEK CO., LTD., Seoul (KR)

(72) Inventor: Young Kil Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 118 days.

(21) Appl. No.: 17/789,090

(22) PCT Filed: Dec. 23, 2020

(86) PCT No.: PCT/KR2020/018986
§ 371 (c)(1),
(2) Date: Jun. 24, 2022

(87) PCT Pub. No.: WO2021/133054
PCT Pub. Date: Jul. 1, 2021

(65) Prior Publication Data
US 2022/0357635 A1    Nov. 10, 2022

(30) Foreign Application Priority Data

Dec. 26, 2019   (KR) .................. 10-2019-0175154
Feb. 13, 2020   (KR) .................. 10-2020-0017601

(51) Int. Cl.
*G03B 3/10*   (2021.01)
*G02B 7/08*   (2021.01)
(Continued)

(52) U.S. Cl.
CPC .............. *G03B 3/10* (2013.01); *G02B 7/08* (2013.01); *G03B 30/00* (2021.01); *H04N 23/57* (2023.01);
(Continued)

(58) Field of Classification Search
CPC .............. G02B 27/646; G02B 7/02–04; G02B 7/08–105
See application file for complete search history.

(56) References Cited

U.S. PATENT DOCUMENTS 9,554,023 B2 *   1/2017  Park .................. H04N 23/54
10,197,813 B2    2/2019  Lee et al.
(Continued)

FOREIGN PATENT DOCUMENTS

JP    2017-27017 A    2/2017
JP    2017-215575 A   12/2017
(Continued)

*Primary Examiner* — Leon W Rhodes, Jr.
(74) *Attorney, Agent, or Firm* — Birch, Stewart, Kolasch & Birch, LLP

(57) ABSTRACT

Disclosed in an embodiment is a camera module comprising: a housing; a lens module coupled to the housing; a holder disposed in the housing; an elastic member connecting the housing and the holder; a magnet part and an optical member that are coupled to the holder; and a coil part facing the magnet part, wherein the holder includes a first protrusion that extends in an optical axis direction so as to be coupled to the elastic member, and the elastic member includes a first coupling portion coupled to one surface of the first protrusion; the first protrusion includes a guide protrusion which protrudes from the one surface of the first protrusion in the optical axis direction, wherein the guide protrusion is disposed outside the elastic member and has a shape corresponding to at least a portion of the outer circumference of the first coupling portion.

20 Claims, 27 Drawing Sheets

(51) Int. Cl.
  *G03B 30/00*     (2021.01)
  *H04N 23/57*     (2023.01)
  *G03B 17/56*     (2021.01)

(52) U.S. Cl.
  CPC .... *G03B 17/566* (2013.01); *G03B 2205/0023* (2013.01)

(56) References Cited

U.S. PATENT DOCUMENTS

| | | | |
|---|---|---|---|
| 10,871,622 B2 * | 12/2020 | Chao | ........................ G02B 7/02 |
| 2015/0319345 A1 | 11/2015 | Park | |
| 2018/0011285 A1 | 1/2018 | Aschwanden et al. | |

FOREIGN PATENT DOCUMENTS

| | | | | |
|---|---|---|---|---|
| JP | 2018-506071 A | | 3/2018 | |
| JP | 3221890 U | | 6/2019 | |
| KR | 10-2012-0059844 A | | 6/2012 | |
| KR | 20150089648 | * | 8/2015 | ............ G02B 7/021 |
| KR | 10-2016-0041500 A | | 4/2016 | |
| KR | 10-2017-0070553 A | | 6/2017 | |
| KR | 10-2019-0119904 A | | 10/2019 | |
| KR | 10-2019-0139009 A | | 12/2019 | |

\* cited by examiner

[FIG. 1]
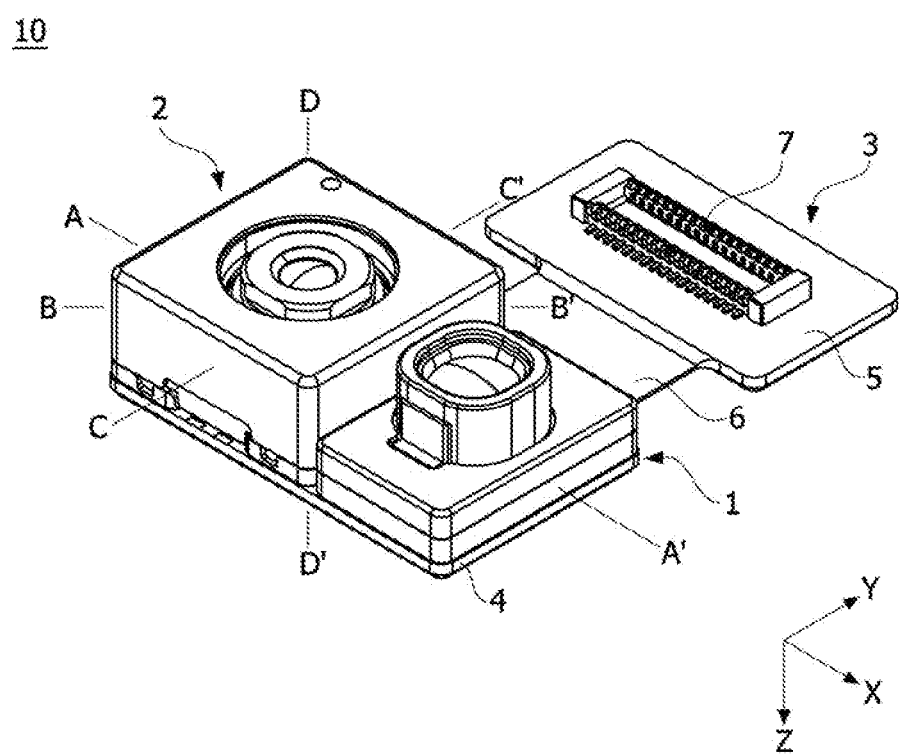

[FIG. 2]
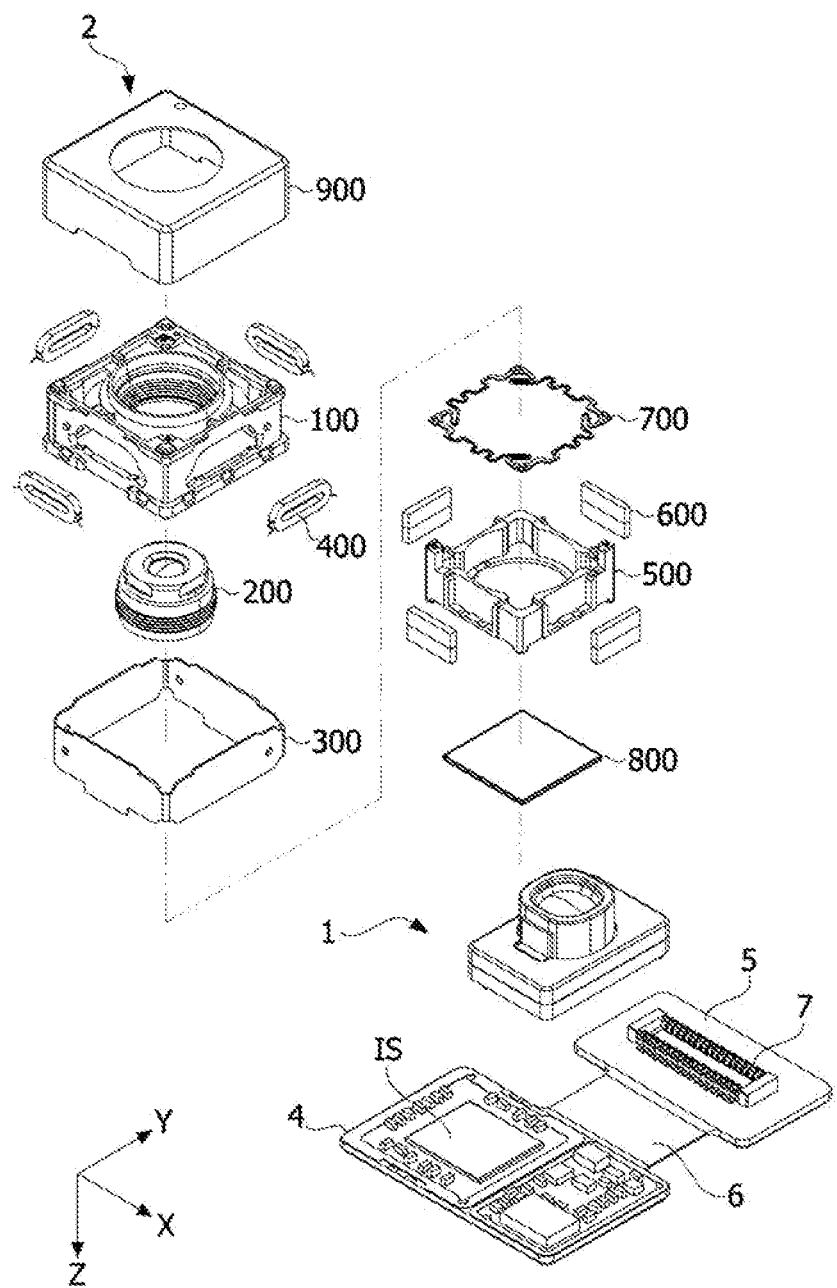

[FIG. 3A]
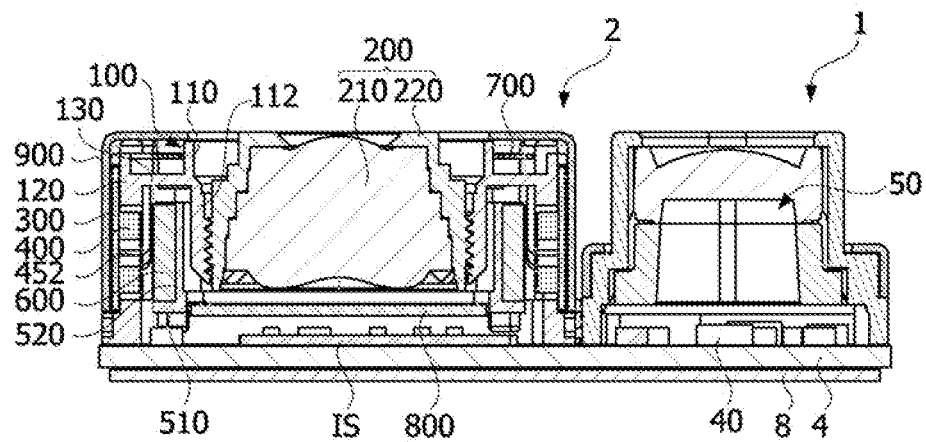
[FIG. 3B]
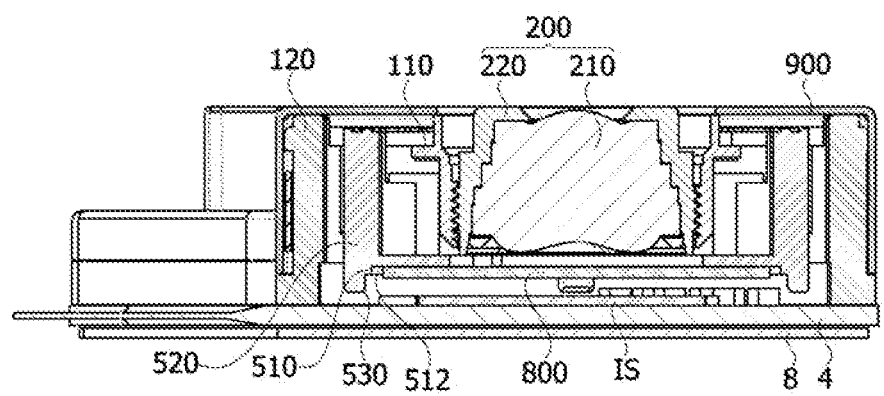
[FIG. 3C]
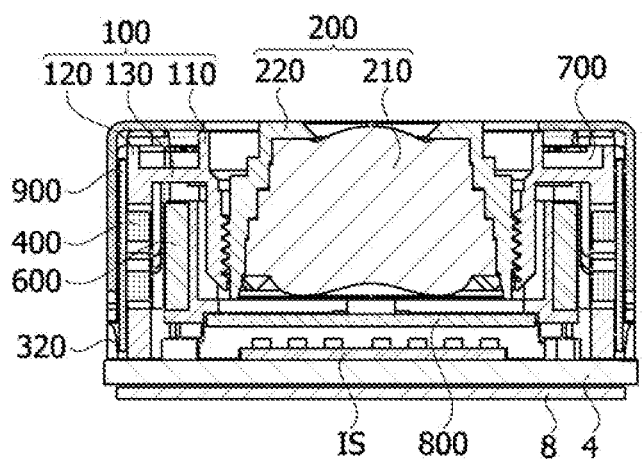

[FIG. 3D]
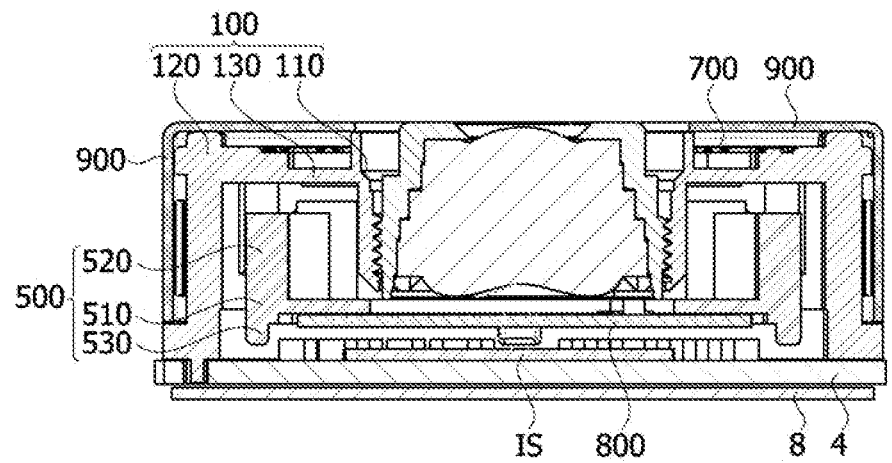
[FIG. 4]
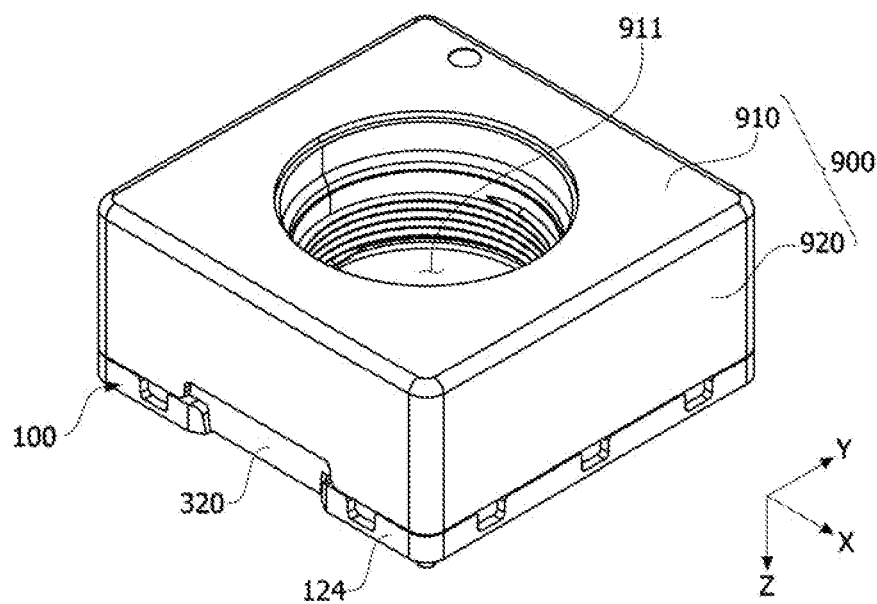

[FIG. 5]
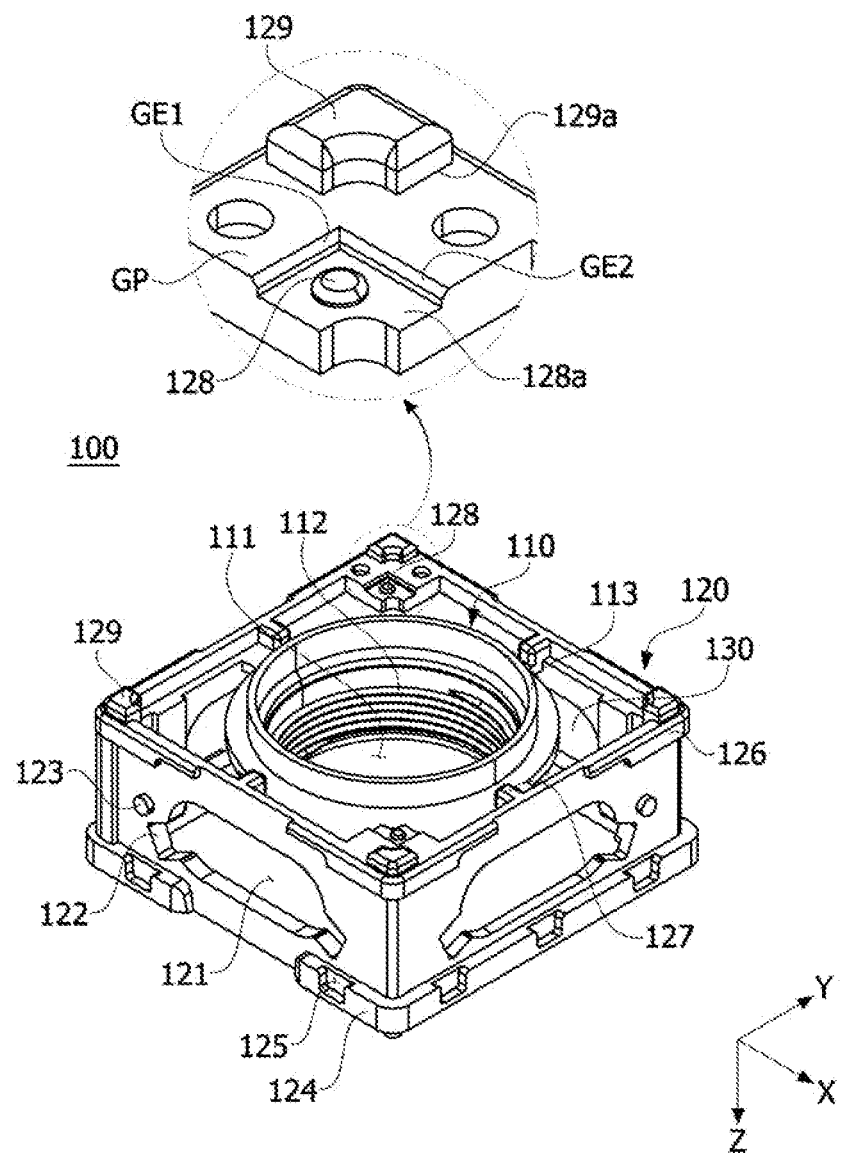

[FIG. 6]
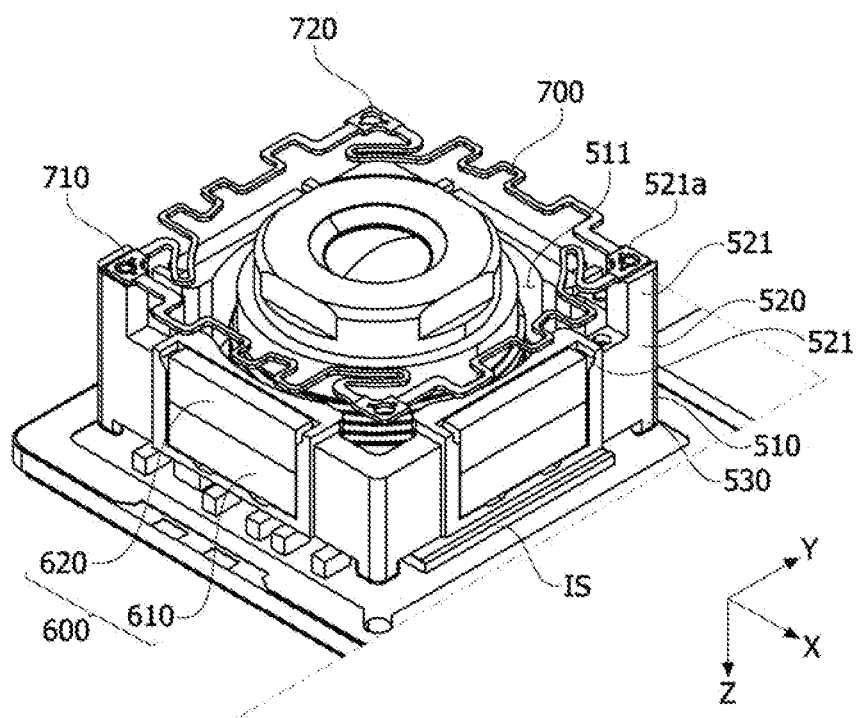

[FIG. 7]
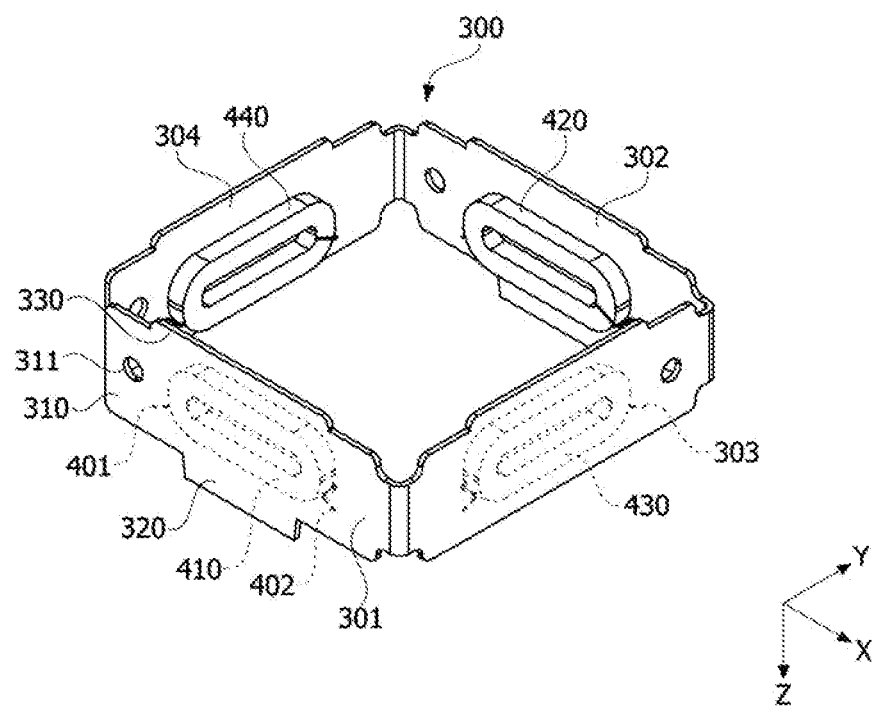

[FIG. 8]
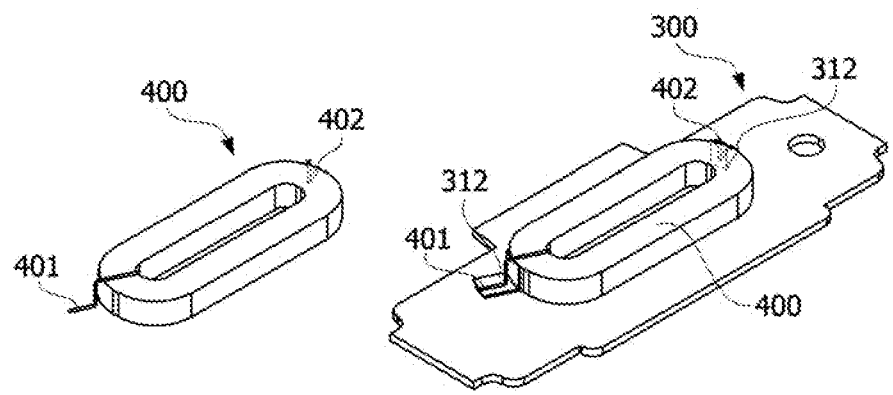
(a)
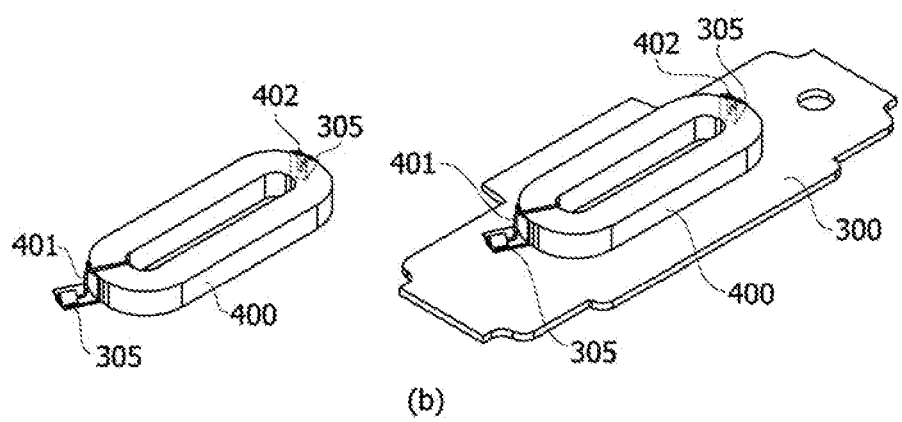
(b)

[FIG. 9]
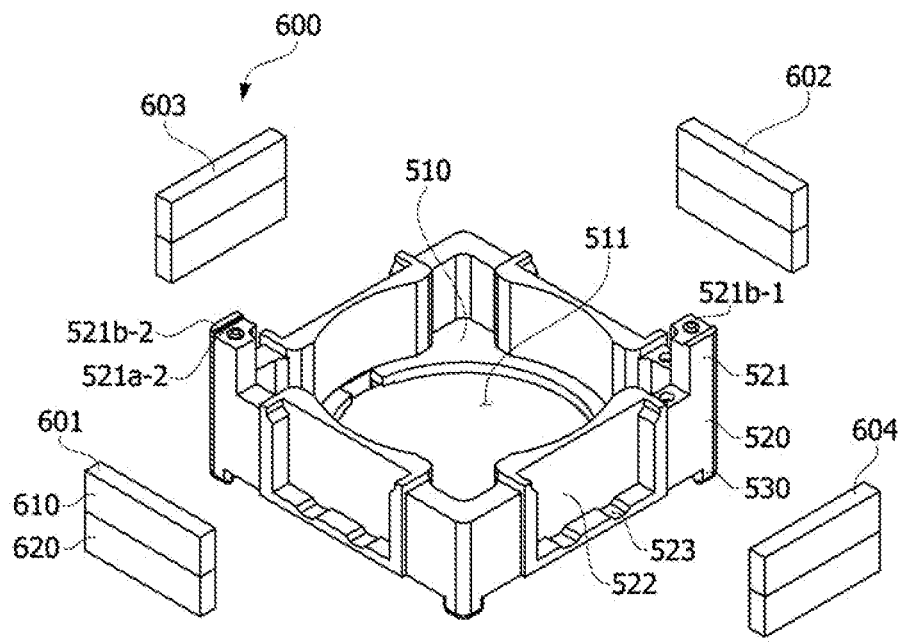
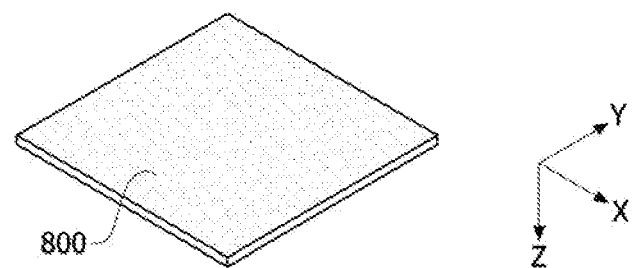

[FIG. 10]
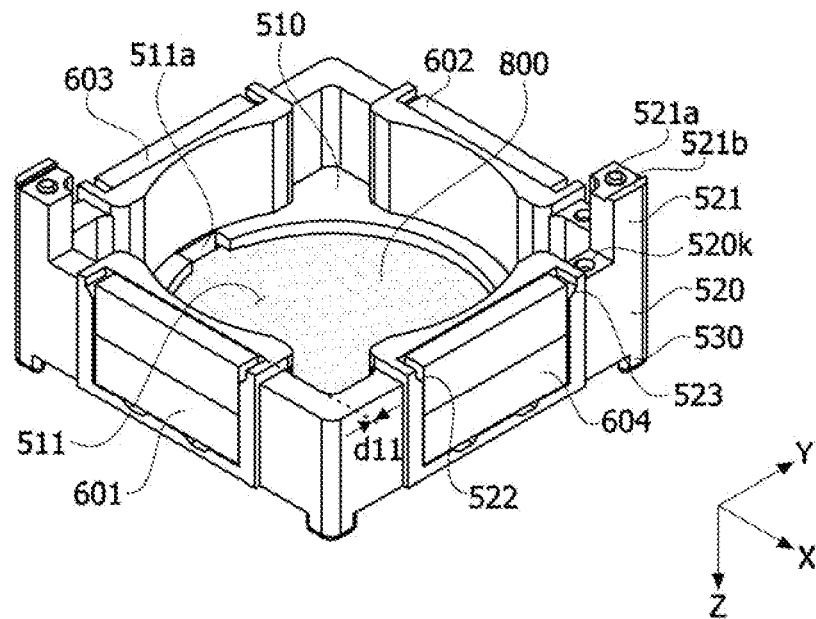
[FIG. 11]
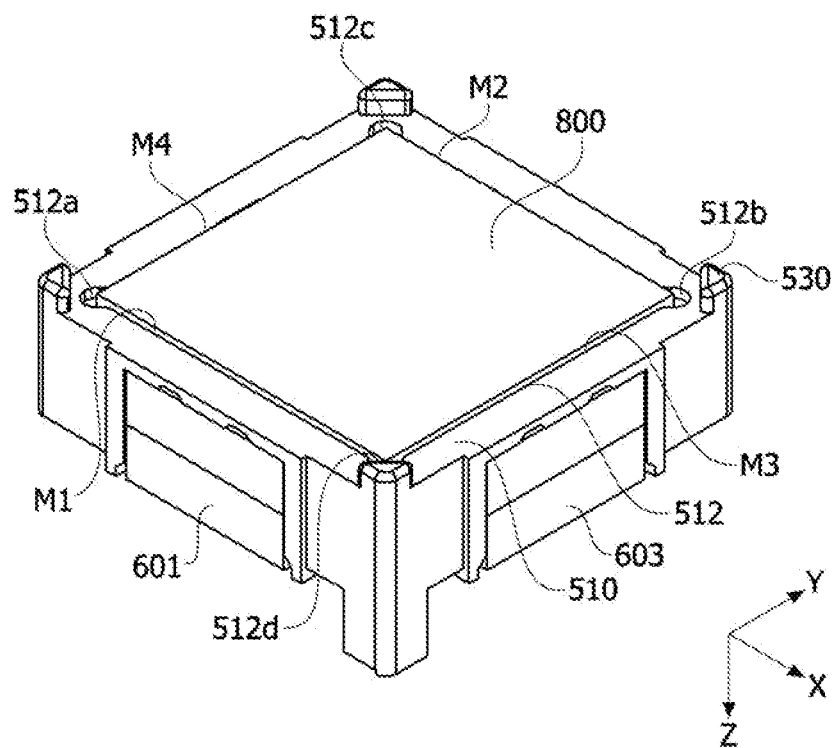

[FIG. 12]
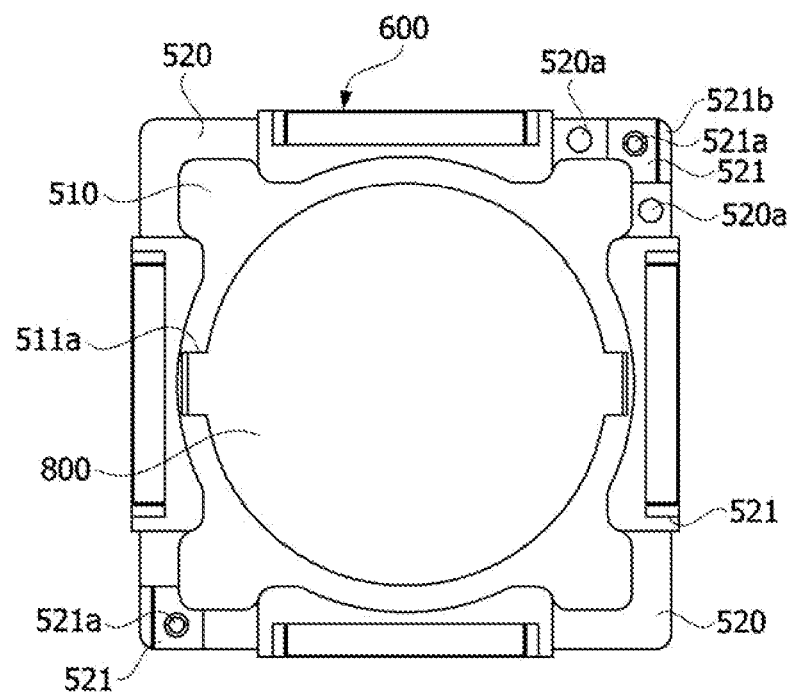

[FIG. 13]
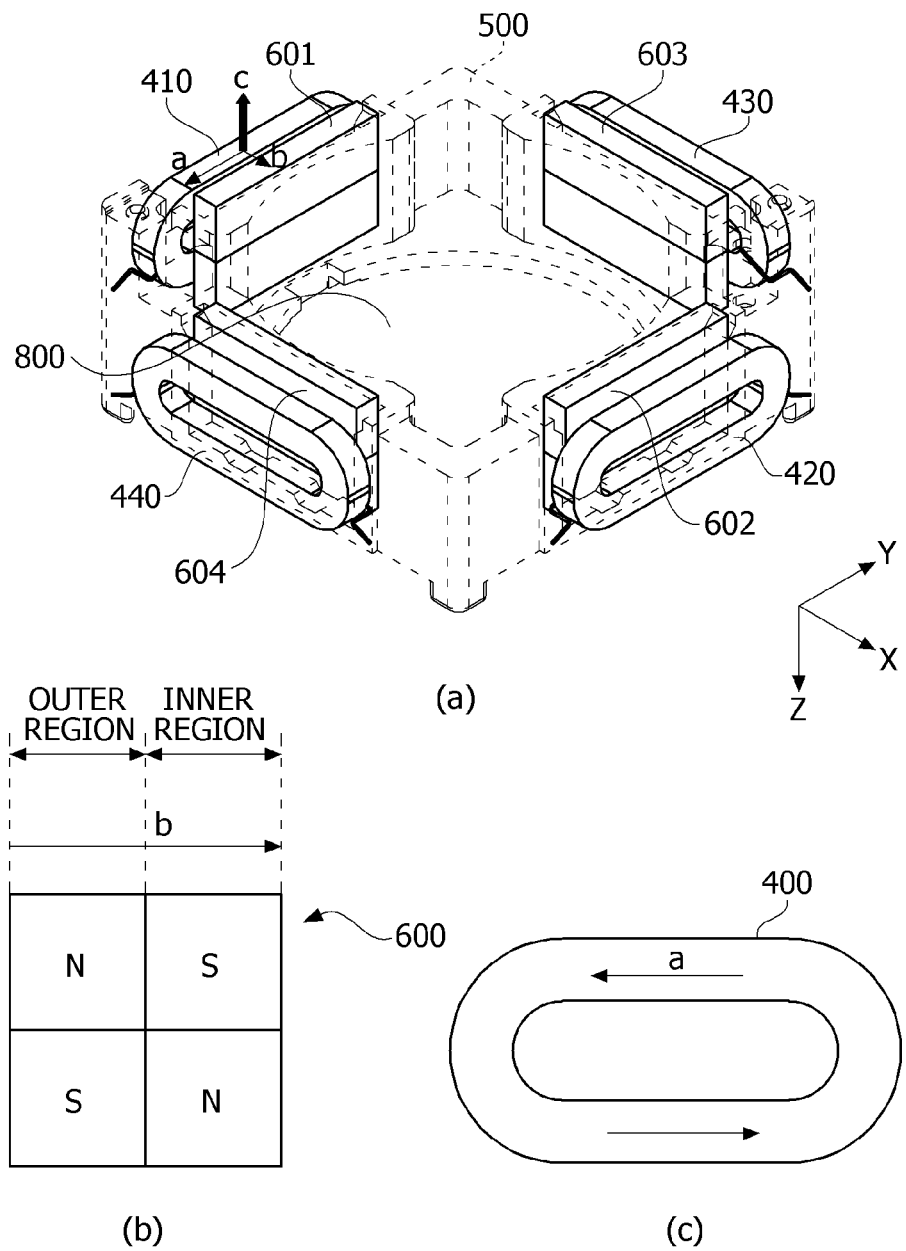

[FIG. 14]
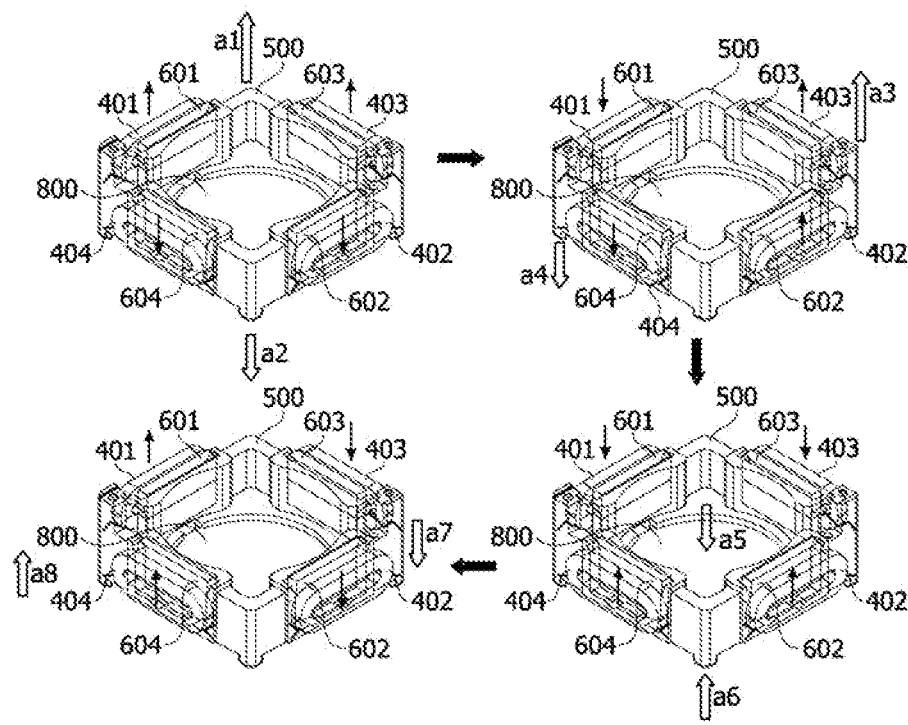
[FIG. 15]
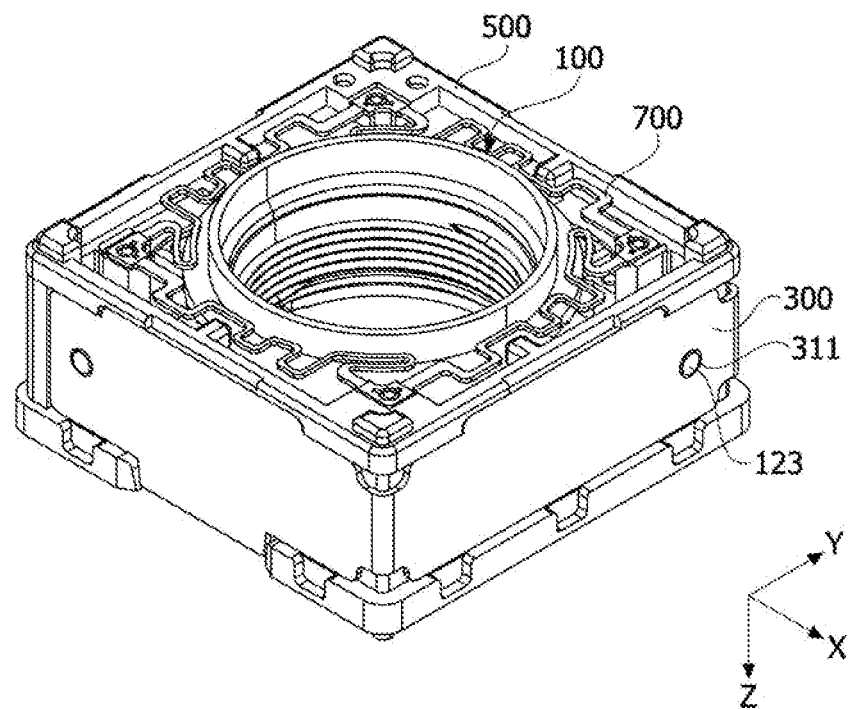

[FIG. 16]
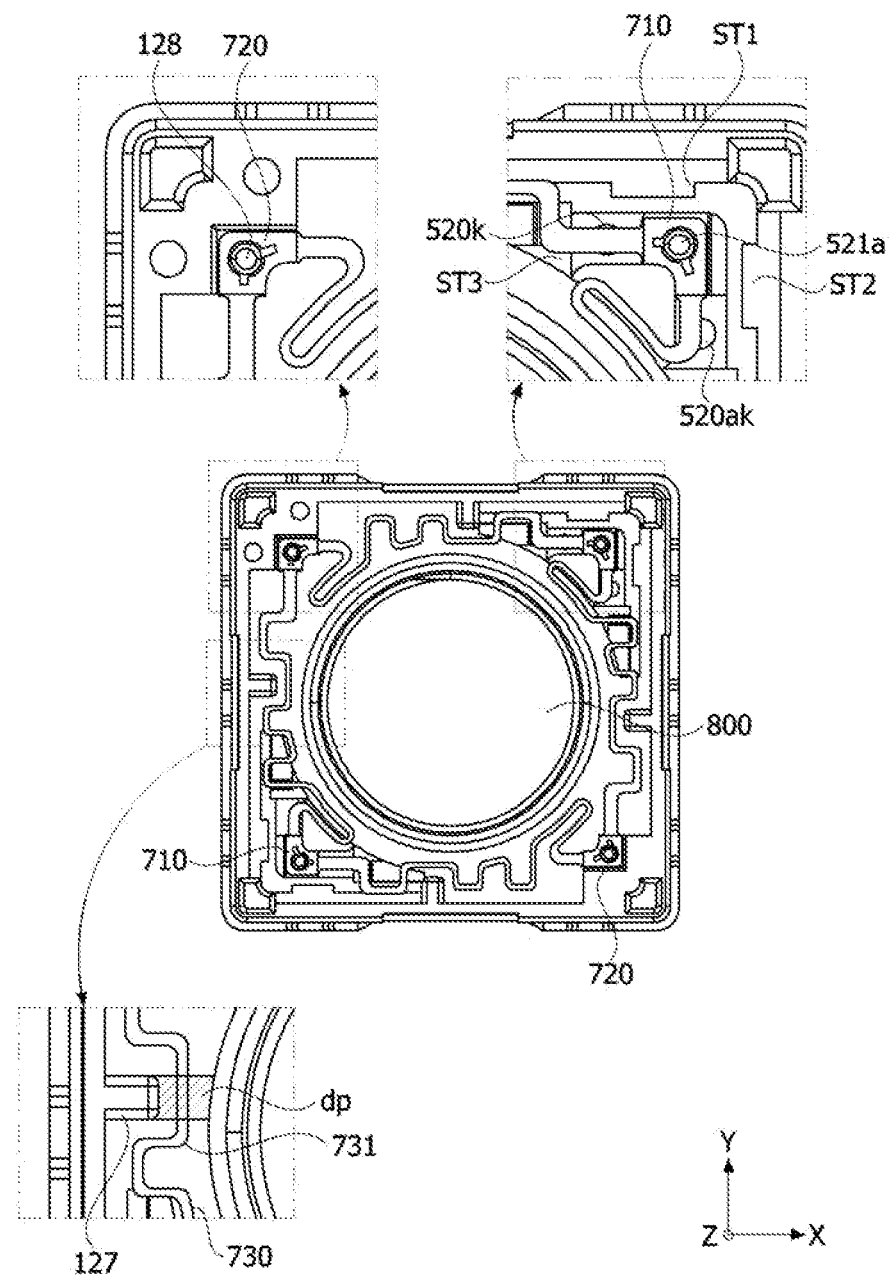

[FIG. 17]
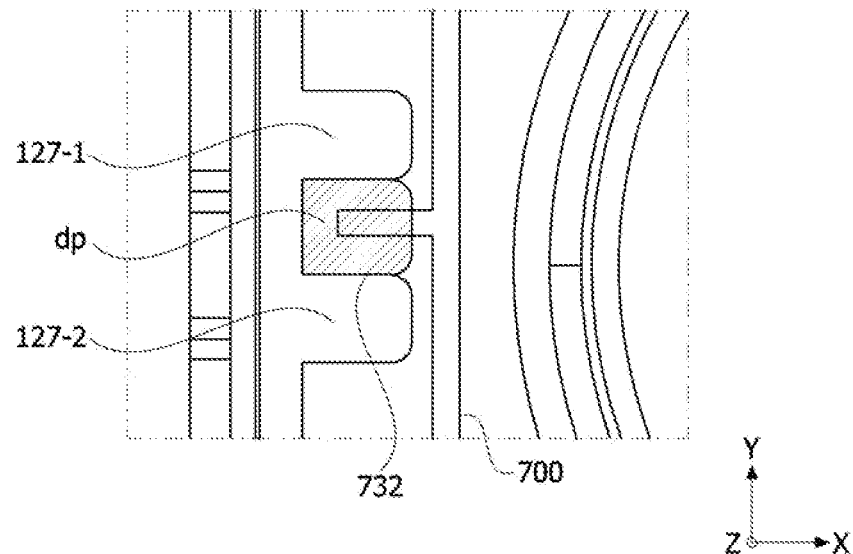
[FIG. 18]
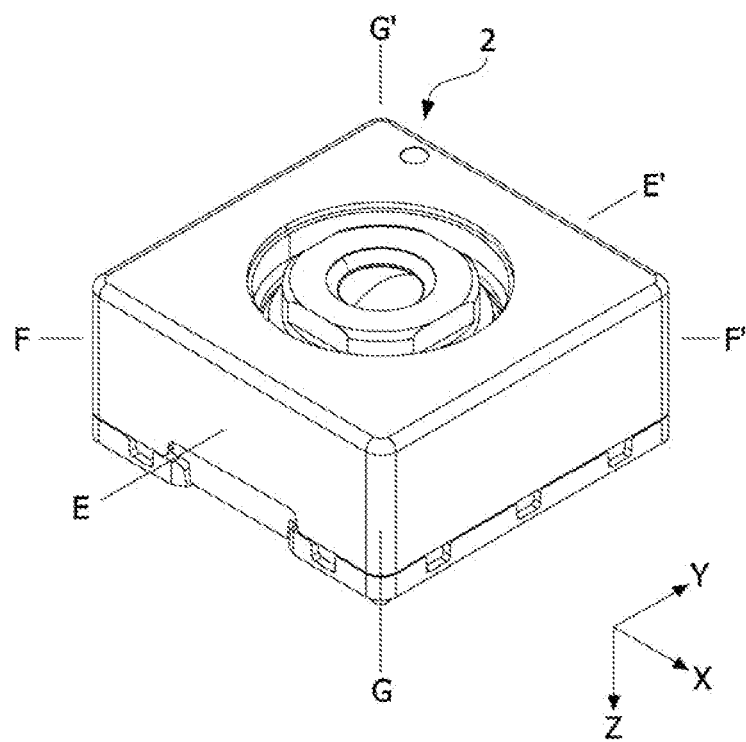

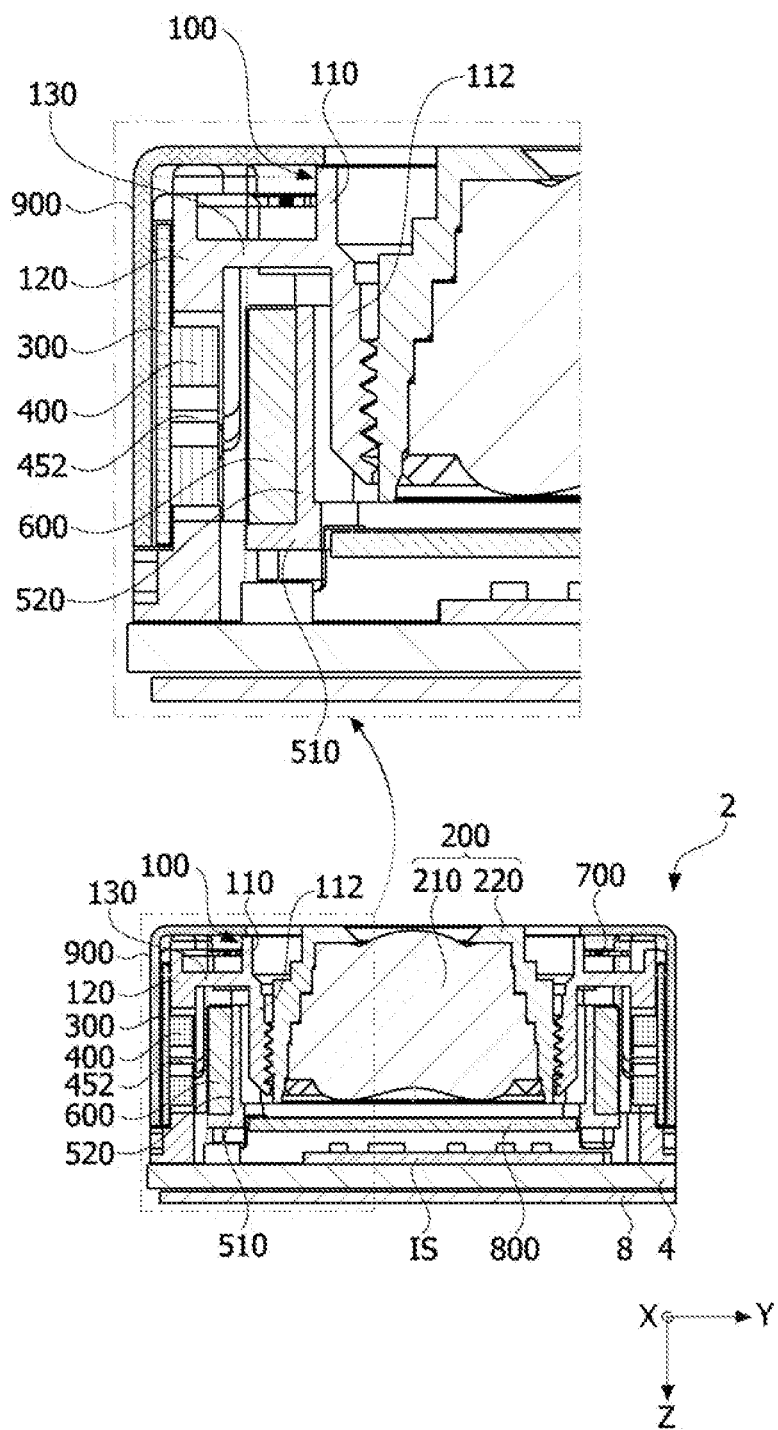
[FIG. 19]

[FIG. 20]
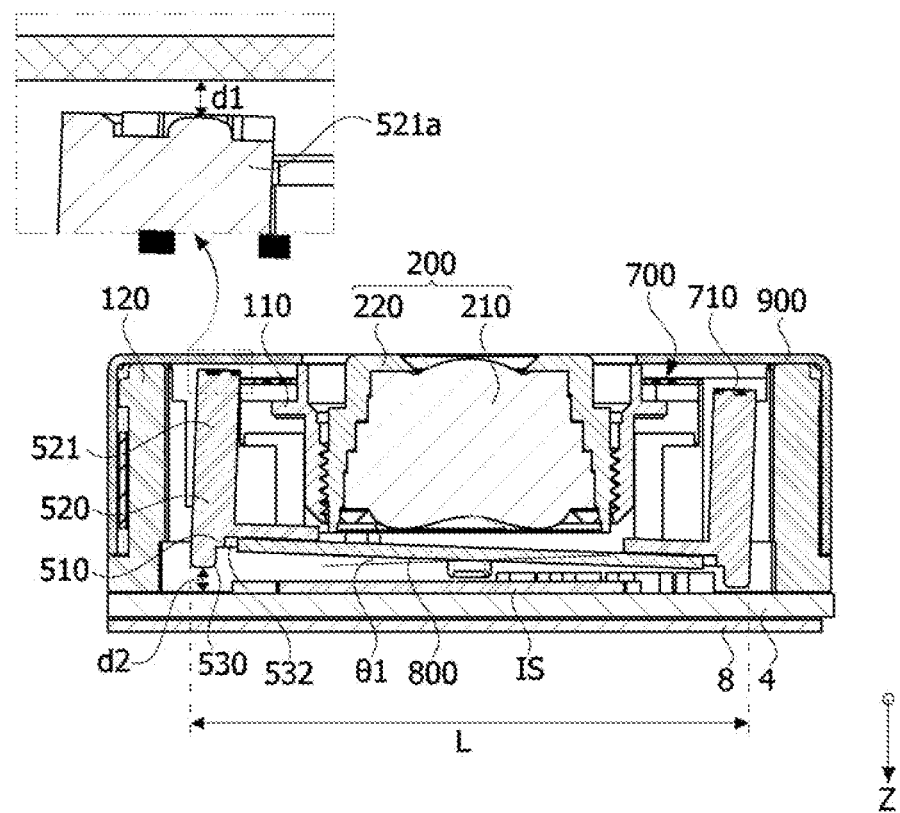
[FIG. 21]
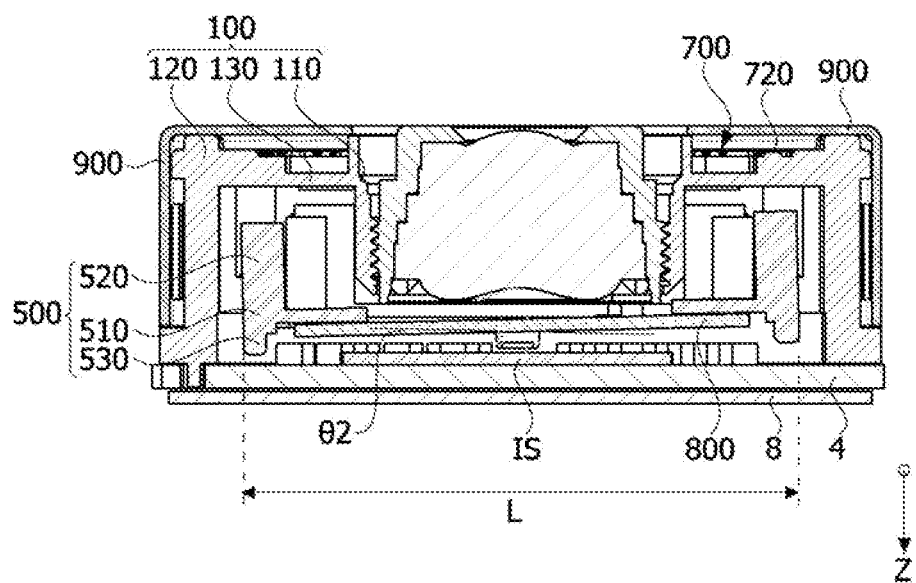

[FIG. 22]
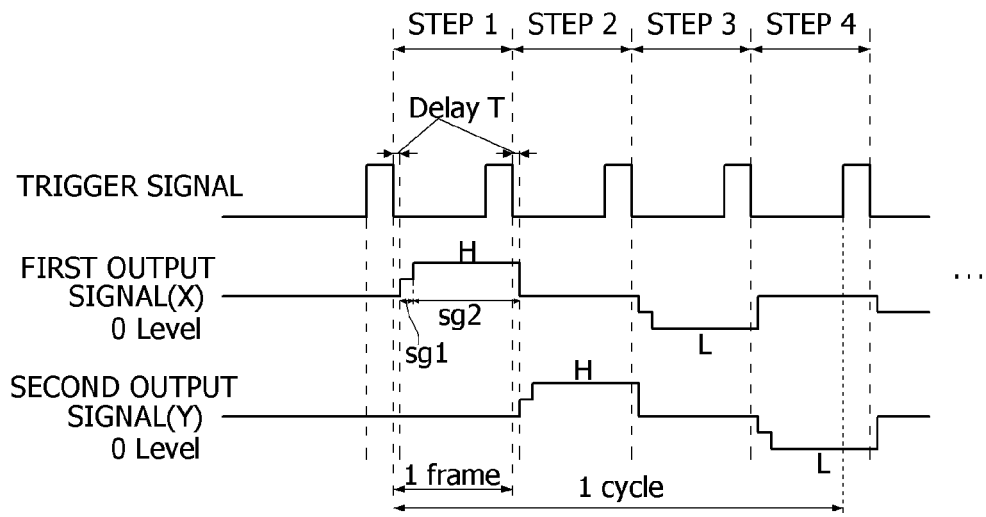
[FIG. 23]
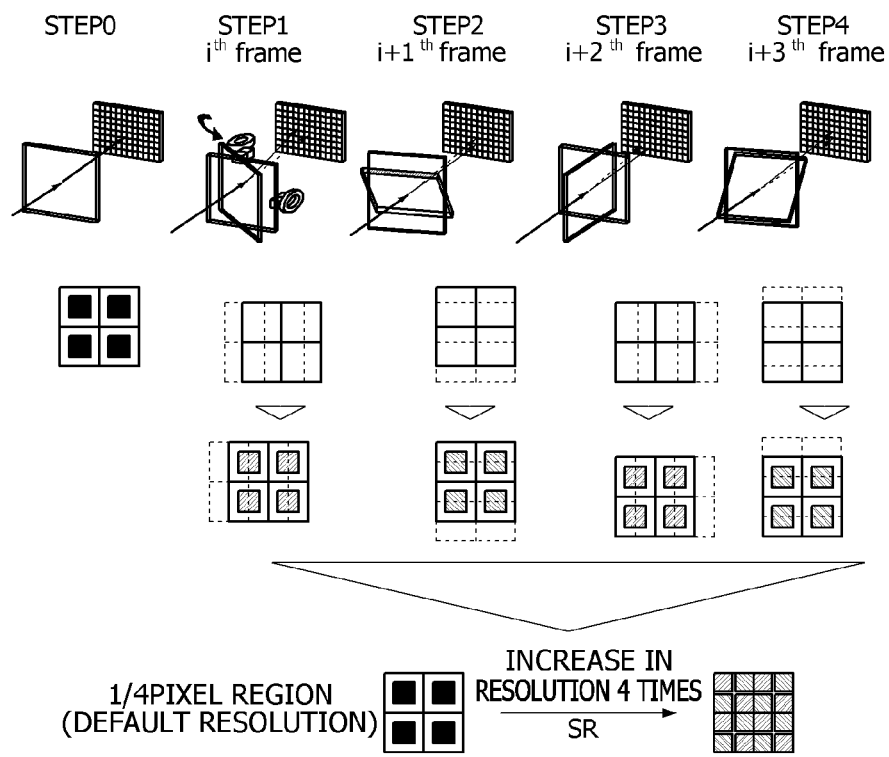

[FIG. 24]
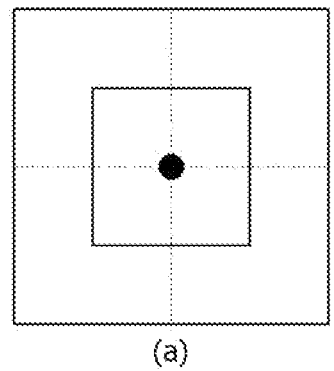
(a)
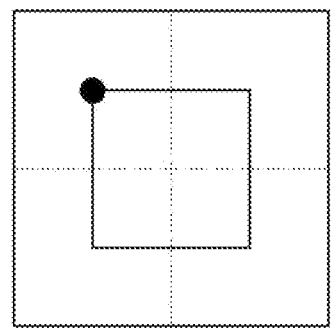
(b)
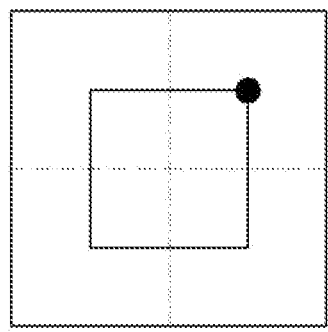
(c)
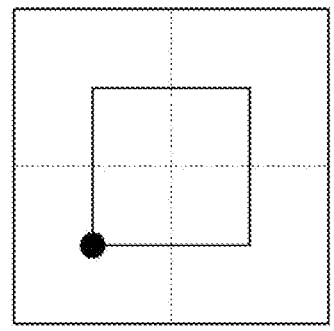
(e)
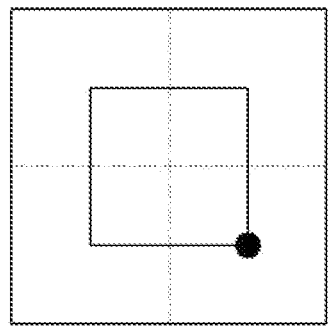
(d)

[FIG. 25]
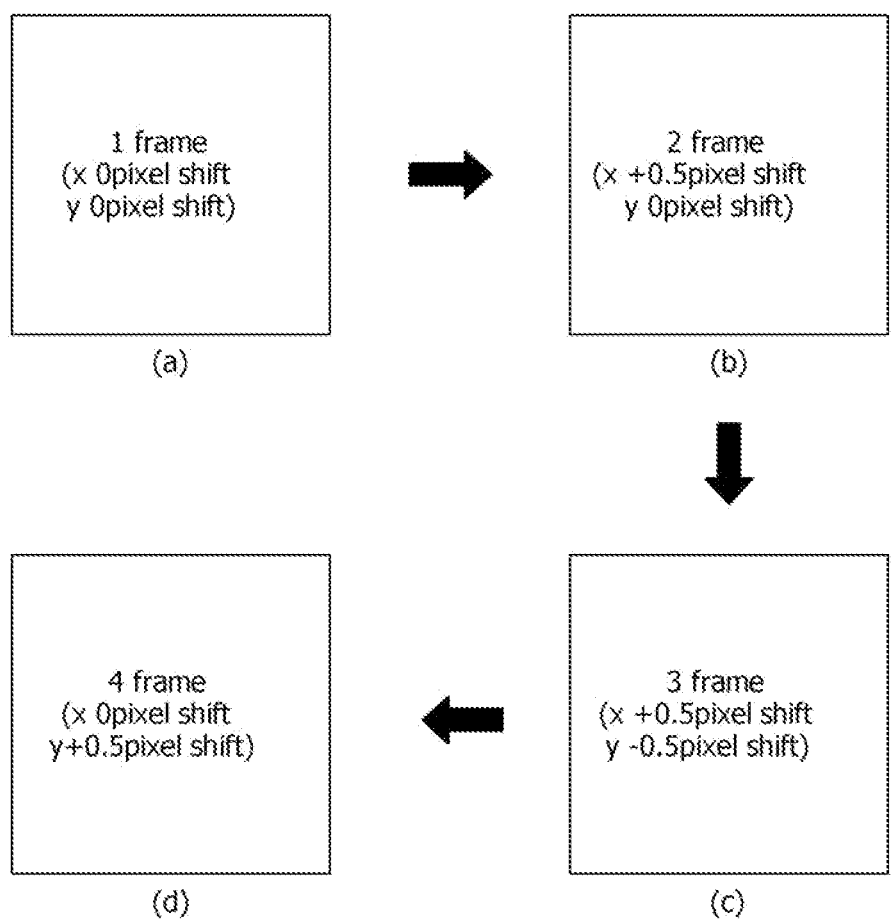

[FIG. 26]

(FIRST FRAME IMAGE)

(SECOND FRAME IMAGE)

(THIRD FRAME IMAGE)

(FOURTH FRAME IMAGE)

(SR IMAGE)

[FIG. 27]
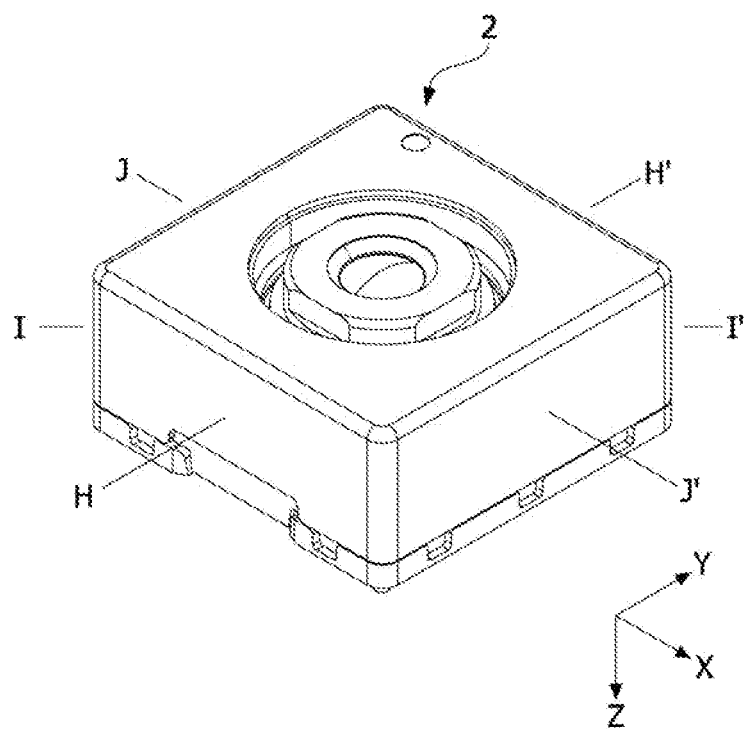

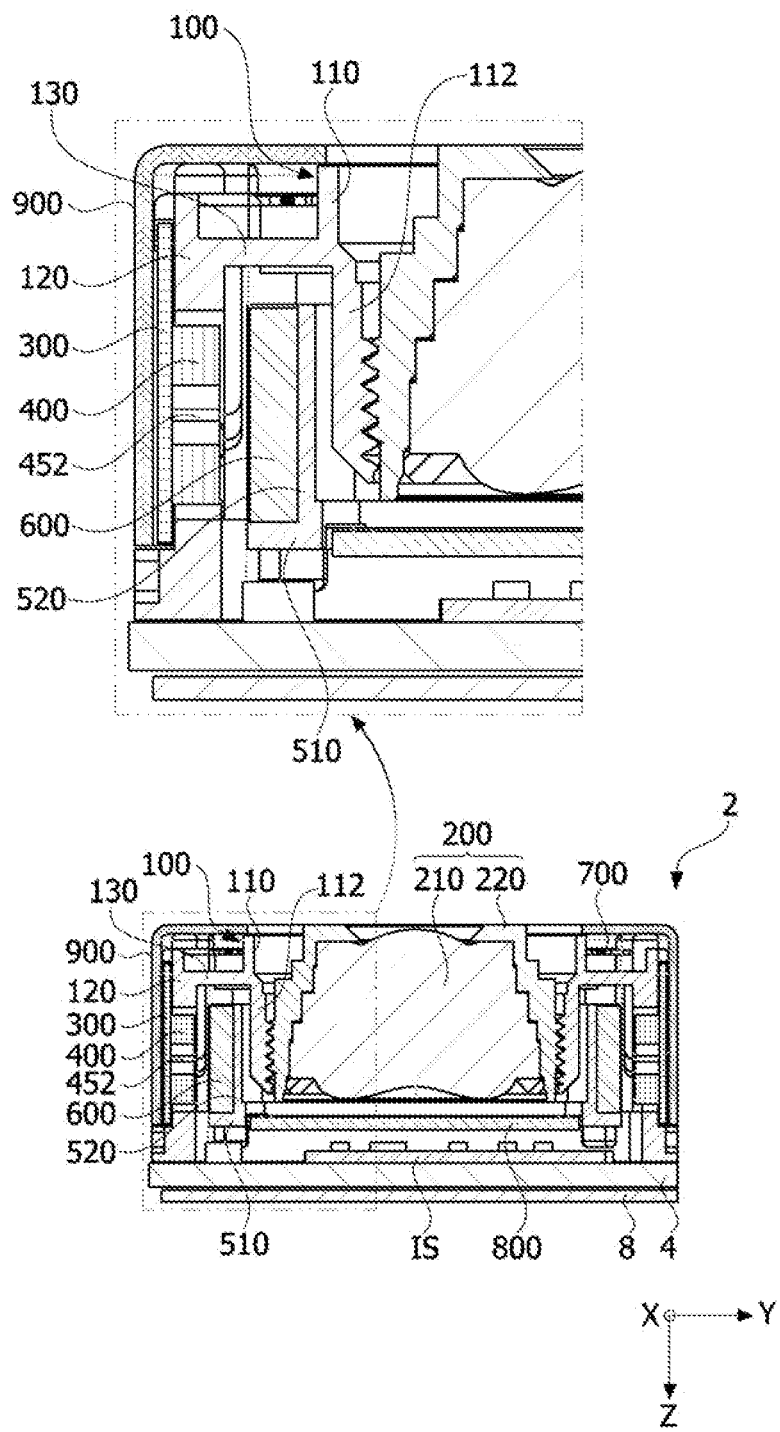
[FIG. 28]

[FIG. 29]
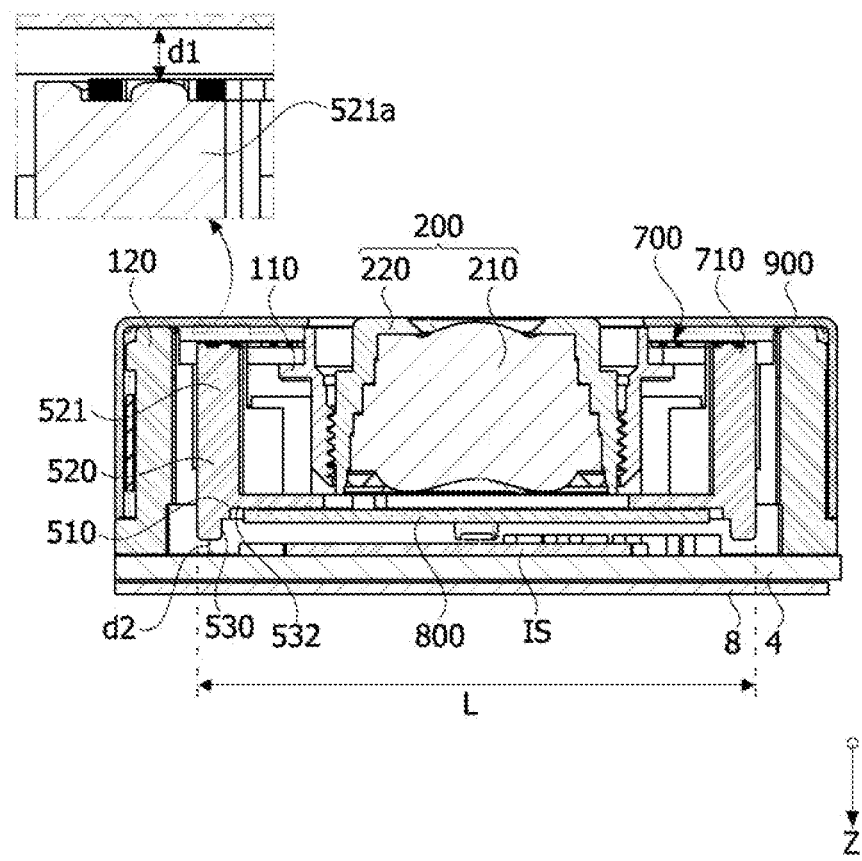
[FIG. 30]
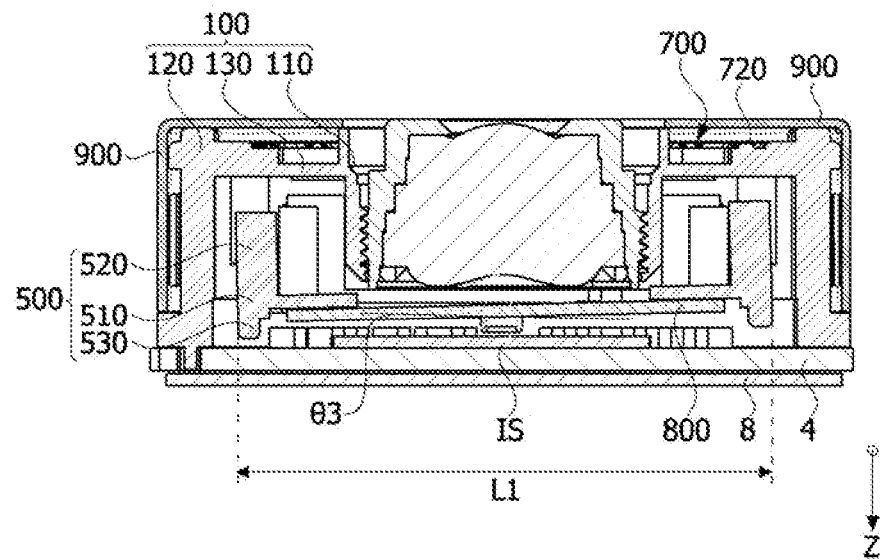

[FIG. 31]
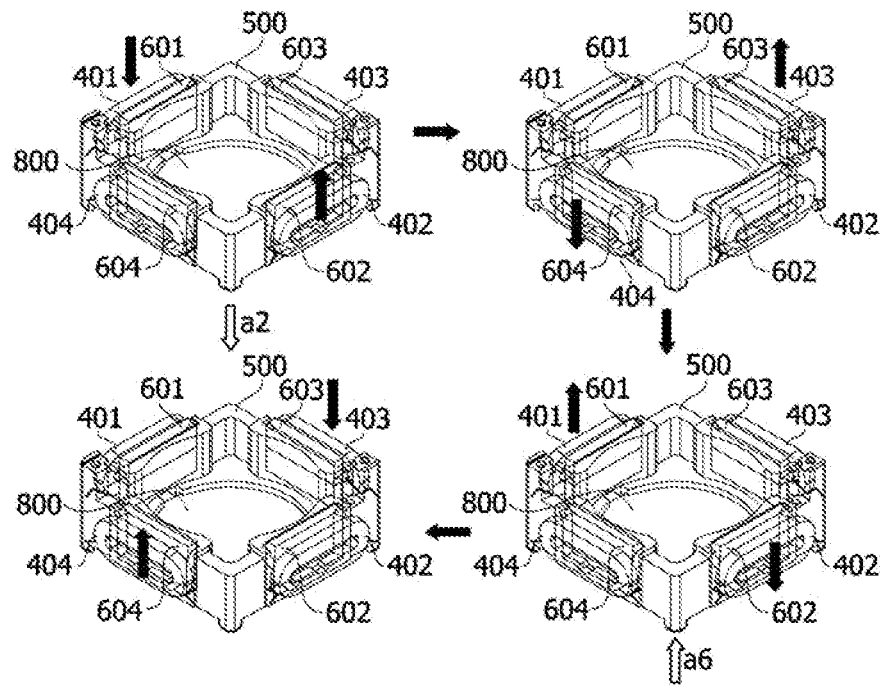
[FIG. 32]
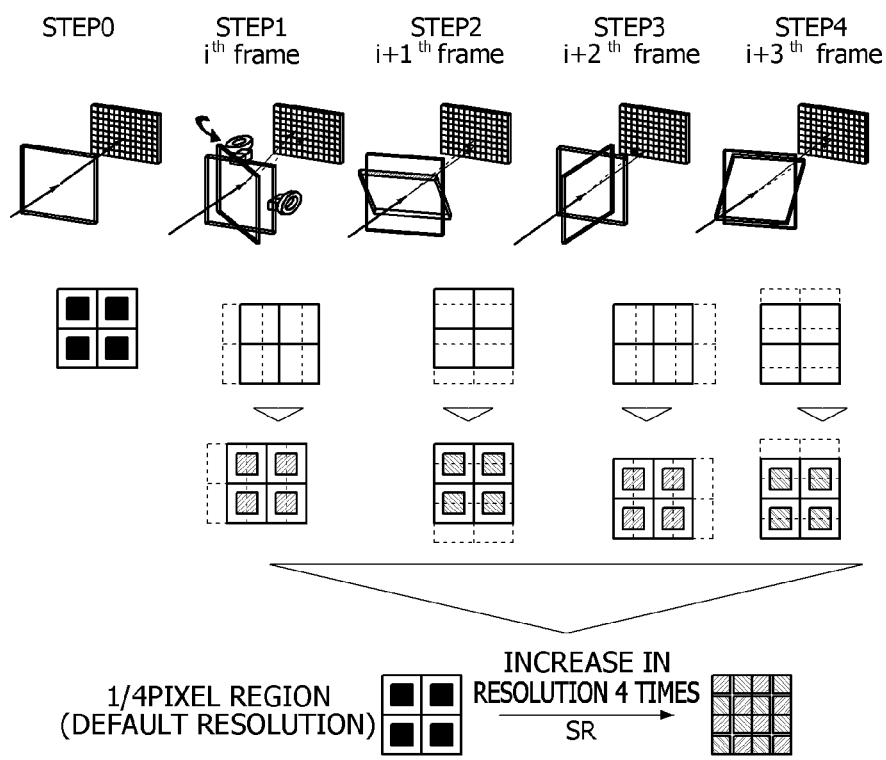

[FIG. 33]
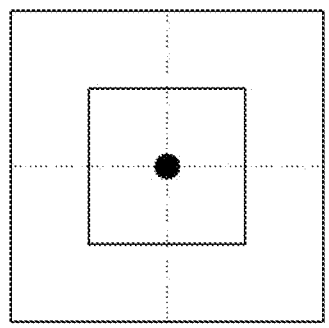
(a)
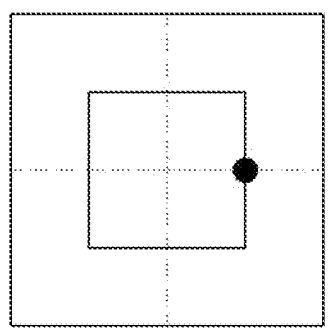  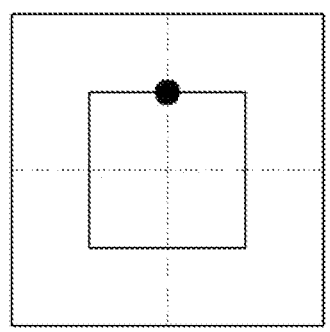
(b)   (c)
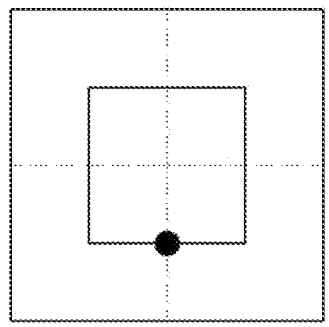  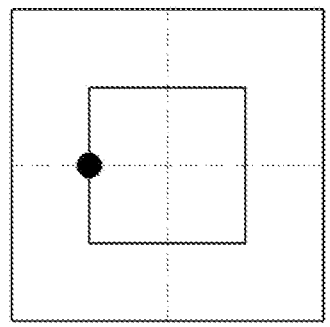
(e)   (d)

[FIG. 34]
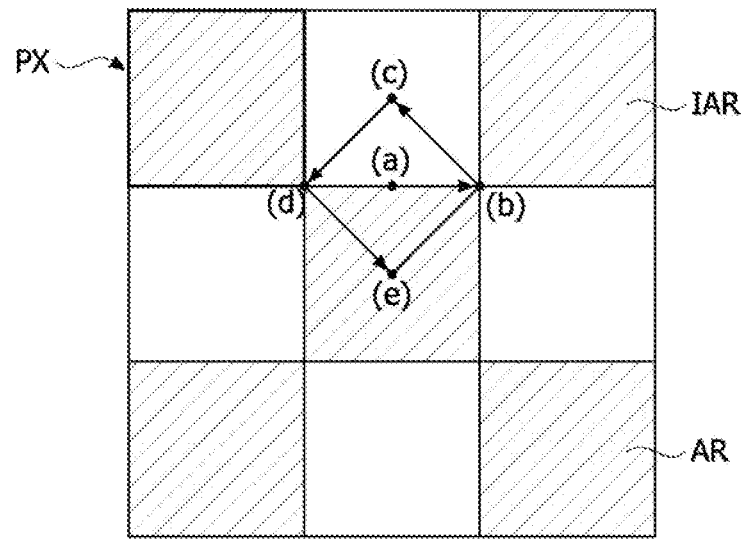
[FIG. 35]
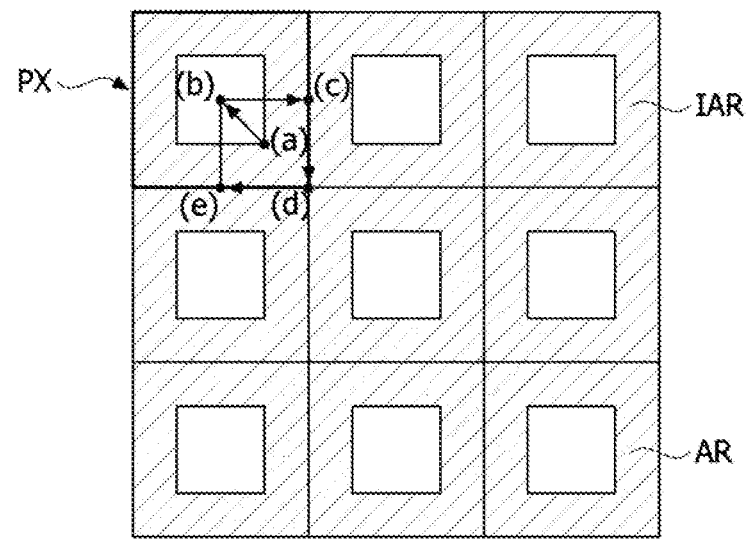

CAMERA MODULE

CROSS REFERENCE TO RELATED APPLICATIONS

This application is the National Phase of PCT International Application No. PCT/KR2020/018986, filed on Dec. 23, 2022, which claims priority under 35 U.S.C. 119 (a) to Patent Application Nos. 10-2019-0175154, filed in the Republic of Korea on Dec. 26, 2019, and 10-2020-0017601, filed in the Republic of Korea on Feb. 13, 2020, all of which are hereby expressly incorporated by reference into the present application.

TECHNICAL FIELD

Embodiments relate to a camera module.

BACKGROUND ART 3-dimensional content is being applied in many fields such as education, manufacturing, and autonomous traveling as well as games and culture. A depth map is required to acquire the 3-dimensional content. The depth map is information indicating a distance in space, and indicates perspective information of another point with respect to one point in a 2-dimensional image.

Recently, a time of flight (ToF) is attracting attention as a method of acquiring the depth map. According to the ToF method, a distance to an object is calculated by measuring a flight time, that is, a time at which light is emitted and reflected. The biggest advantage of the ToF method is that the ToF method provides distance information on a 3-dimensional space quickly in real time. In addition, a user may obtain accurate distance information without employing a separate algorithm or hardware correction. In addition, accurate depth map may be obtained even when measuring a very close subject or measuring a moving subject.

However, in the case of the current ToF method, there is a problem in that information that may be obtained per frame, that is, a resolution is low.

The number of pixels of a sensor may be increased to increase the resolution, but in this case, there is a problem in that the volume and manufacturing cost of the camera module are greatly increased.

Technical Problem

Embodiments are directed to providing a camera module that may be used in a ToF method to increase a resolution.

In addition, embodiments are directed to providing a camera module capable of performing a super resolution (SR) technique.

The objects of embodiments are not limited thereto, and will also include a technical solution described below or objects or effects that may be identified from the embodiments.

Technical Solution

A camera module according to an embodiment includes: a housing; a lens module coupled to the housing; a holder disposed in the housing; an elastic member configured to connect the housing and the holder; a magnet part and an optical member coupled to the holder; and a coil part facing the magnet part, wherein the holder may include a first protrusion extending in an optical axis direction and coupled to the elastic member, the elastic member may include a first coupling portion coupled to one surface of the first protrusion, the first protrusion may include a guide protrusion protruding from the one surface of the first protrusion in the optical axis direction, the guide protrusion may be disposed more outwardly than the elastic member, and the guide protrusion may include a shape corresponding to at least a part of an outer circumference of the first coupling portion.

The holder may include: a base disposed below the first protrusion; and a sidewall disposed between the base and the first protrusion.

The camera module may further include a cover disposed on the housing, and including an upper plate and a side plate extending from the upper plate, wherein the first protrusion may be spaced part from the upper plate by a first distance in an initial state in which a current is not applied to the coil part, and the first distance may satisfy Equation 1 below.

$$L \times \tan(0.75 \times \theta) \leq \text{first distance} \leq L \times \tan(1.25 \times \theta) \quad [\text{Equation 1}]$$

(where L refers to a maximum length of the base, and $\theta$ refers to a maximum tilting angle of the holder in a diagonal direction)

The first protrusion may further include a protrusion extending in the optical axis direction, and the guide protrusion may be disposed more outwardly than the protrusion.

The first coupling portion may include a hole through which the protrusion passes.

The protrusion may include a first protrusion and a second protrusion, and the first protrusion and the second protrusion may be positioned in a diagonal direction.

The housing may include an inner portion to which the lens module is coupled, an outer portion to which the coil part is coupled, and a connection portion configured to connect the inner portion and the outer portion.

The outer portion may include a housing protrusion protruding upward, and the elastic member may include a second coupling portion including a hole through which the housing protrusion passes.

The first protrusion may be formed on an upper portion of the sidewall, the base may include a base groove disposed on a lower surface, and the optical member may be disposed in the base groove.

The base groove may include a coupling groove formed at a corner.

The camera module may further include an adhesive member positioned in the coupling groove to couple the base and the optical member.

The magnet part may include a first magnet, a second magnet disposed opposite to the first magnet, a third magnet, and a fourth magnet disposed opposite to the third magnet, and the coil part may include a first coil facing the first magnet, a second coil facing the second magnet, a third coil facing the third magnet, and a fourth coil facing the fourth magnet.

The first coil and the third coil may have currents applied in different directions, the second coil and the fourth coil may have currents applied in different directions, and the optical member may be tilted in a diagonal direction.

A current may be applied to two coils facing each other among the first coil, the second coil, the third coil, and the fourth coil.

A camera module according to another embodiment includes: a housing; a lens module coupled to the housing; a holder disposed between the housing and the lens module; an elastic member configured to connect the housing and the holder; a magnet part and an optical member coupled to the holder; and a coil part facing the magnet part, wherein the holder may include a first protrusion extending in an optical axis direction and coupled to the elastic member, and the holder may include a second protrusion protruding downward.

The holder may include a base disposed between the first protrusion and the second protrusion, and the second protrusion may be disposed at a corner of the base.

The base may include a base groove disposed on a lower surface.

The base may further include a coupling groove disposed at a corner thereunder, and the optical member may be disposed in the base groove and coupled to the base by an adhesive member.

A camera module according to still another embodiment includes: a housing; a lens module coupled to the housing; a holder disposed in the housing and the lens module; an elastic member configured to connect the housing and the holder; a magnet part and an optical member coupled to the holder; and a coil part facing the magnet part, wherein the housing may include a housing protrusion disposed at an outer portion and protruding in an optical axis direction, and a guiding part disposed more outwardly than the elastic member and protruding in the optical axis direction, the elastic member may include a second coupling portion coupled to the housing protrusion, and the guiding part may include a shape corresponding to at least a part of an outer circumference of the second coupling portion.

The housing may include an inner portion to which the lens module is coupled, the outer portion to which the coil part is coupled, and a connection portion configured to connect the inner portion and the outer portion, and may further include a housing protrusion protruding upward from the outer portion, the guiding part may be disposed on the outer portion and disposed more outwardly than the housing protrusion, and the elastic member may include a second coupling portion including a hole through which the housing protrusion passes.

A ToF camera device according to an embodiment includes: a light emitting part configured to emit light; and a light receiving part configured to receive light reflected from an object, wherein the light receiving part may include: a housing; a lens module coupled to the housing; a holder disposed in the housing; an elastic member configured to connect the housing and the holder; a magnet part and an optical member coupled to the holder; and a coil part facing the magnet part, wherein the holder may include a first protrusion extending in an optical axis direction and coupled to the elastic member, the elastic member may include a first coupling portion coupled to one surface of the first protrusion, the first protrusion may include a guide protrusion protruding from the one surface of the first protrusion in the optical axis direction, the guide protrusion may be disposed more outwardly than the elastic member, and the guide protrusion may include a shape corresponding to at least a part of an outer circumference of the first coupling portion.

Advantageous Effects

According to embodiments, it is possible to acquire a depth map with the high resolution even without greatly increasing the number of pixels of a sensor.

In addition, it is possible to acquire high-resolution images through an SR technique from a plurality of low-resolution images obtained from a camera module according to embodiments.

The various and beneficial advantages and effects of the present invention are not limited to the above-described description, and will be understood more easily in the process of describing the specific embodiments of the present invention.

DESCRIPTION OF DRAWINGS

FIG. 1 is a perspective view of a camera module according to an embodiment.

FIG. 2 is an exploded perspective view of the camera module according to the embodiment.

FIG. 3A is a cross-sectional view taken along line AA' in FIG. 1.

FIG. 3B is a cross-sectional view taken along line BB' in FIG. 1.

FIG. 3C is a cross-sectional view taken along line CC' in FIG. 1.

FIG. 3D is a cross-sectional view taken along line DD' in FIG. 1.

FIG. 4 is a perspective view of some components of a light receiving part of the camera module according to the embodiment.

FIG. 5 is a perspective view of a housing of the camera module according to the embodiment.

FIG. 6 is a perspective view of some components of the camera module according to the embodiment.

FIG. 7 is a perspective view of a substrate and a coil of the camera module according to the embodiment.

FIG. 8 is a view showing the coupling between coils and substrates of camera modules according to various embodiments.

FIG. 9 is an exploded perspective view showing a holder, a magnet, and an optical member of the camera module according to the embodiment.

FIG. 10 is a perspective view showing the holder, the magnet, and the optical member of the camera module according to the embodiment.

FIG. 11 is a perspective view from a different angle in FIG. 10.

FIG. 12 is a top view of the holder, the magnet, and the optical member of the camera module according to the embodiment.

FIG. 13 is a view for describing a Lorentz force between the magnet and the coil in the embodiment.

FIG. 14 is a view for describing a diagonal tilting control of the optical member in the embodiment.

FIG. 15 is a perspective view of a part of the camera module including an elastic member according to the embodiment.

FIG. 16 is a top view of a part of the camera module including the elastic member according to the embodiment.

FIG. 17 is a view of a part of the camera module including the elastic member according to the embodiment according to a modified example.

FIG. 18 is a perspective view of the camera module according to the embodiment.

FIG. 19 is a cross-sectional view taken along line EE' in FIG. 18.

FIG. 20 is a cross-sectional view taken along line FF' in FIG. 18.

FIG. 21 is a cross-sectional view taken along line GG' in FIG. 18.

FIG. 22 is a view for describing the driving of a camera according to the embodiment.

FIG. 23 is a view for describing a super resolution (SR) technique according to the embodiment of the present invention.

FIG. 24 is a conceptual diagram conceptually and sequentially showing a plurality of images acquired from each step in FIG. 23.

FIG. 25 is a view sequentially showing images of first to fourth frames acquired for the SR technique from the camera module according to the embodiment.

FIG. 26 is a view for describing an SR image.

FIG. 27 is a perspective view of the camera module according to the embodiment.

FIG. 28 is a cross-sectional view taken along line HH' in FIG. 27.

FIG. 29 is a cross-sectional view taken along line II' in FIG. 27.

FIG. 30 is a cross-sectional view taken along line Jr in FIG. 27.

FIG. 31 is a view for describing the driving of a camera module according to another embodiment.

FIG. 32 is a view showing an optical path moving process according to another embodiment.

FIG. 33 is a conceptual diagram conceptually and sequentially showing a plurality of images acquired for an SR technique from the camera module according to another embodiment.

FIGS. 34 and 35 are views showing tilt application examples of the camera module according to the embodiment.

MODES OF THE INVENTION

Hereinafter, preferred embodiments of the present invention will be described in detail with reference to the accompanying drawings.

However, the technical spirit of the present invention is not limited to some embodiments described but may be implemented in various different forms, and one or more of the components may be used by being selectively coupled or substituted between the embodiments without departing from the technical spirit scope of the present invention.

In addition, terms (including technical and scientific terms) used in the embodiments of the present invention may be construed as the meaning that may be generally understood by those skilled in the art to which the present invention pertains, unless specifically defined and described explicitly, and the meaning of generally used terms such as terms defined in the dictionary may be construed in consideration of the contextual meaning of the related art.

In addition, the terms used in the embodiments of the present invention are intended to describe the embodiments and are not intended to limit the present invention.

In this specification, the singular form may also include the plural form unless otherwise specified in the phrase, and when it is described as "at least one (or one or more) of A and B, C", it may include one or more of all possible combinations of A, B, and C.

In addition, in describing the components of the embodiment of the present invention, terms such as first, second, A, B, (a), and (b) may be used.

These terms are only intended to distinguish the component from other components, and the essence, sequence, or order of the corresponding components is not limited by the terms.

In addition, when it is described that a component is "connected", "coupled", or "connected" to another component, this may include not only a case in which the component is directly connected, coupled, or connected to another component, but also a case in which the component is "connected", "coupled", or "connected" to another component through other components interposed therebetween.

In addition, when it is described as being formed or disposed on "on (above) or under (below)" of each component, on (above) or under (below) includes not only a case in which two components come into direct contact with each other but also a case in which one or more other components are formed or disposed between the two components. In addition, when expressed as "on (above) or under (below)", this may also include the meaning of not only an upward direction but also a downward direction with respect to one component.

Hereinafter, an optical device according to this embodiment will be described.

The optical device may include any one of a cell phone, a mobile phone, a smart phone, a portable smart device, a digital camera, a laptop computer, a digital broadcasting terminal, a personal digital assistant (PDA), a portable multimedia player (PMP), and a navigation device. However, the type of the optical device is not limited thereto, and any device for capturing images or photos may be included in the optical device.

The optical device may include a main body. The main body may have a bar shape. Alternatively, the main body may have various structures such as a slide type, a folder type, a swing type, and a swirl type, in which two or more sub-bodies are coupled to be relatively movable. The main body may include a case (casing, housing, cover) forming an external appearance. For example, the main body may include a front case and a rear case. Various electronic parts of the optical device may be embedded in a space formed between the front case and the rear case.

The optical device may include a display. The display may be disposed on one surface of the main body of the optical device. The display may output images. The display may output images captured by a camera.

The optical device may include the camera. The camera may include a time of flight (ToF) camera device. The ToF camera device may be disposed on a front surface of the main body of the optical device. In this case, the ToF camera device may be used for various types of biometric recognition, such as a user's face recognition and iris recognition for security authentication of the optical device.

Hereinafter, a configuration of the ToF camera device according to the embodiment will be described with reference to the drawings.

FIG. 1 is a perspective view of a camera module according to an embodiment, FIG. 2 is an exploded perspective view of the camera module according to the embodiment, FIG. 3A is a cross-sectional view taken along line AA' in FIG. 1, FIG. 3B is a cross-sectional view taken along line BB' in FIG. 1, FIG. 3C is a cross-sectional view taken along line CC' in FIG. 1, and FIG. 3D is a cross-sectional view taken along line DD' in FIG. 1.

The ToF camera device may include a camera device. The ToF camera device may include a camera module.

Referring to FIGS. 1 to 3D, the camera module may include a light emitting part 1. The light emitting part 1 may be a light emitting module, a light emitting unit, a light emitting assembly, or a light emitting device. The light emitting part 1 may generate an output light signal and then irradiate the output light signal to an object. At this time, the light emitting part 1 may generate and output the output light signal in the form of a pulse wave or a continuous wave. The continuous wave may be in the form of a sinusoid wave or a square wave. By generating the output light signal in the form of the pulse wave or the continuous wave, for example, the ToF camera device may detect a phase difference between an output light signal output from the light emitting part 1 and an input light that is reflected from the object and then input to a light receiving part 2 of the ToF camera device. In this specification, the output light may mean light output from the light emitting part 1 and incident on the object, and the input light may mean light that is output from the light emitting part 1 to reach the object, is reflected from the object, and then is input to the ToF camera device. From the object's point of view, the output light may be incident light, and the input light may be reflected light.

The light emitting part 1 irradiates the generated output light signal to the object for a predetermined integration time. Here, the integration time means one frame time. When a plurality of frames are generated, the set integration time is repeated. For example, when the ToF camera device captures the object at 20 FPS, the integration time is ½₀ [sec]. In addition, when 100 frames are generated, the integration time may be repeated 100 times.

In addition, the light emitting part 1 may generate a plurality of output light signals having different frequencies. The light emitting part 1 may sequentially and repeatedly generate the plurality of output light signals having different frequencies. Alternatively, the light emitting part 1 may simultaneously generate the plurality of output light signals having different frequencies as well.

The light emitting part 1 may include a light source 40. The light source 40 may generate light. The light source 40 may output light. The light source 40 may irradiate light. Light generated by the light source 40 may be infrared rays having a wavelength of 770 nm to 3000 nm. Alternatively, light generated by the light source 40 may be visible rays having a wavelength of 380 nm to 770 nm. The light source 40 may include all of various elements configured to generate and output light. For example, the light source 40 may include a light emitting diode (LED). In addition, the light source 40 may include a plurality of light emitting diodes having a form arranged according to a constant pattern. In addition, the light source 40 may include an organic light emitting diode (OLED) or a laser diode (LD).

The light emitting part 1 may include a light modulation part configured to modulate light. The light source 40 may generate an output light signal in the form of the pulse wave or in the form of the continuous wave by being repeatedly turned on/off at certain time intervals. The certain time interval may be a frequency of the output light signal. The turning-on/off of the light source 40 may be controlled by the light modulation part. The light modulation part may control the turning-on/off of the light source 40 to control the light source 40 to generate the output light signal in the form of the continuous wave or the pulse wave. The light modulation part may control the light source 40 to generate the output light signal in the form of the continuous wave or the pulse wave through frequency modulation, pulse modulation, or the like.

The light emitting part 1 may include a diffuser 50. The diffuser 50 may be a diffuser lens. The diffuser 50 may be disposed in front of the light source 40. Light emitted from the light source 40 may pass through the diffuser 50 and may be incident on the object. The diffuser 50 may change a path of light emitted from the light source 40. The diffuser 50 may condense light emitted from the light source 40.

The light emitting part 1 may include a cover. The cover may be disposed to cover the light source 40. The cover may be disposed on a main substrate 4. The cover may include an upper plate including a hole, and a side plate extending from the upper plate.

The camera module 10 may include the light receiving part 2. The light receiving part 2 may be a light receiving module, a light receiving unit, a light receiving assembly, or a light receiving device, and may be one component of the camera module. The light receiving part 2 may receive light emitted from the light emitting part 1 and reflected from the object, and convert the received light into an electrical signal. The light receiving part 2 may generate input light corresponding to the output light signal output from the light emitting part 1. The light receiving part 2 may be disposed side by side with the light emitting part 1. The light receiving part 2 may be disposed next to the light emitting part 1. The light receiving part 2 may be disposed in the same direction as the light emitting part 1. According to this configuration, it is possible to improve the reception efficiency of the input light in the light receiving part 2.

Specifically, the light receiving part 2 may include a housing 100, a lens module 200, a substrate 300, a coil part 400, a holder 500, a magnet part 600, an elastic member 700, an optical member 800, a cover 900, and an image sensor IS.

First, the housing 100 may be positioned inside the cover 900 to be described below. The housing 100 may be coupled to the lens module 200, the substrate 300, the coil part 400, and the elastic member 700, which will be described below. A detailed description thereof will be given below.

In an embodiment, the housing 100 may include an inner portion 110, an outer portion 120, and a connection portion 130 disposed between the inner portion 110 and the outer portion 120. A detailed description thereof will be given below.

The lens module 200 may pass through light reflected from the object. An optical axis of the lens module 200 and an optical axis of the image sensor IS may be aligned. In addition, the lens module 200 may be coupled to the housing 100. In addition, the lens module 200 may be fixed to the housing 100. The lens module 200 may be composed of a plurality of optical members, but is not limited thereto.

The lens module 200 may include a lens accommodating part 210 on which the optical member is seated and a lens cover 220 configured to surround the lens accommodating part 210. The lens cover 220 may come into contact with the housing 100 and may be moved up and down by a voice coil motor or the like, as will be described below. Accordingly, a focus of light passing through the lens module 200 may be changed.

The substrate 300 may be coupled to the housing 100. The substrate 300 may be coupled to a substrate protrusion formed on a side surface of the housing 100. In addition, the substrate 300 may further include a terminal portion 320. The terminal portion 320 is a part extending downward from a body portion 310 of the substrate 300, and may be electrically connected to the main substrate 4.

The coil part 400 may include a plurality of coils, and may be positioned on the side surface of the housing 100. The coil part 400 may be positioned in each housing hole formed on the side surface of the housing 100. The coil part 400 may be electrically connected to the substrate 300. For example, the coil part 400 may be connected to the substrate 300 through a wire or the like. In addition, since the substrate 300 is coupled to the housing 100 as described above, the coil part 400 may also be seated in the housing hole formed on the side surface of the housing 100 and coupled to the housing. A detailed description thereof will be given below.

The holder 500 may be accommodated in the housing 100. In addition, the holder 500 may be coupled to the optical member 800 and the magnet part 600, which will be described below. In an embodiment, the holder 500 may be tilted. The holder 500 may include a base 510, a sidewall 520, and a second protrusion 530. A detailed description thereof will be given below.

The magnet part 600 may be composed of a plurality of magnets. The magnet part 600 may be seated in a holder groove formed on a side surface of the holder 500. In addition, the magnet part 600 may be positioned to face the coil part 400. According to this configuration, a Lorentz force may be generated, and the magnet part 600, the holder 500 coupled to the magnet part 600, and the optical member 800 coupled to the holder 500 may be tilted by the Lorentz force. A detailed description thereof will be given below.

The elastic member 700 may be disposed on the housing 100 and the holder 500. The elastic member 700 may be positioned between the cover 900 and the holder 500. A detailed description thereof will be given below.

The optical member 800 may be coupled to the holder 500. The optical member 800 may be disposed between the lens module 200 and the image sensor IS. The optical member 800 may be disposed on an optical path between the object and the image sensor IS. The optical member 800 may filter light having a predetermined wavelength range. The optical member 800 may transmit light of a specific wavelength. In other words, the optical member 800 may reflect or absorb, and thus block light other than the specific wavelength. For example, the optical member 800 may pass through infrared rays and block light of wavelengths other than the infrared rays. Alternatively, the optical member 800 may pass through visible rays and block light having wavelengths other than the visible rays.

In addition, the optical member 800 may move. The optical member 800 may move integrally with the holder 500. In an embodiment, the optical member 800 may be tilted. The optical member 800 may be tilted to adjust the optical path. When the optical member 800 is tilted, the path of light incident on the image sensor IS may be changed. The optical member 800 may change a field of view (FOV) angle of the incident light or a direction of the FOV thereof.

The optical member 800 may be a filter. For example, the optical member 800 may be an infrared ray bandpass filter. Accordingly, the optical member 800 may pass only infrared rays. Alternatively, the optical member may be a separate focus fixed lens or variable focus lens (e.g., liquid lens) separated from the lens module.

In addition, in the embodiment, as the optical member 800 is tilted to be inclined, the path through which light enters may be changed, thereby enabling high-resolution time of flight (ToF).

The cover 900 may be a bracket. The cover 900 may include a cover can. The cover 900 may be disposed to surround the housing 100. The cover 900 may be coupled to the housing 100. The cover 900 may accommodate the housing 100 therein. The cover 900 may be positioned at the outermost side of the camera module. The cover 900 may have a hexahedral shape with an open lower surface.

In addition, the cover 900 may be a non-magnetic substance. In addition, the cover 900 may be made of a metal. In addition, the cover 900 may be formed of a metal plate.

The cover 900 may be connected to a ground portion of the main substrate 4. Accordingly, the cover 900 may be grounded. In addition, the cover 900 may block electromagnetic interference (EMI). At this time, the cover 900 may be referred to as an "EMI shield can." The cover 900 is a finally assembled part and may protect a product from external impact. The cover 900 may be made of a material having a small thickness and a high stiffness.

The image sensor IS may detect input light. In addition, the image sensor IS may detect input light and output the input light as an electrical signal. In an embodiment, the image sensor IS may detect light having a wavelength corresponding to the wavelength of light output from the light source 40. For example, the image sensor IS may detect infrared rays. Alternatively, the image sensor IS may detect visible rays. The image sensor IS may include various image sensors configured to detect light.

The image sensor IS may include a pixel array configured to receive light passing through the lens module 200 to convert the received light into an electrical signal corresponding to light, a drive circuit configured to drive a plurality of pixels included in the pixel array, and a readout circuit configured to read an analog pixel signal of each pixel. The readout circuit may generate a digital pixel signal (or an image signal) through analog-to-digital conversion by comparing the analog pixel signal with a reference signal. Here, the digital pixel signal of each pixel included in the pixel array constitutes an image signal, and as the image signal is transmitted in a unit of frames, it may be defined as an image frame. In other words, the image sensor may output a plurality of image frames.

In addition, the light receiving part 2 may further include a position sensor 450. The position sensor 450 may be used for a feedback control. The position sensor 450 may include a Hall sensor or a Hall IC. The position sensor 450 may detect the magnet part 600. The position sensor 450 may detect a magnetic force of the magnet part 600. The position sensor 450 may be disposed between the coil parts 400. In addition, the position sensor 450 may be disposed on an inner surface of the substrate 300. However, the present invention is not limited thereto, and the position sensor 450 may also be removed to reduce complexity in the camera module.

The position sensor 450 may include a plurality of position sensors. The position sensor 450 may include two sensors. The position sensor 450 may include a first position sensor 451 and a second position sensor 452. The first position sensor 451 and the second position sensor 452 may be disposed so that the directing directions are perpendicular to each other. Accordingly, the first position sensor 451 and the second position sensor 452 may detect both the X-axis and Y-axis movement of the magnet part 600 in a horizontal direction. In addition, in the embodiment, an additional sensor configured to detect the movement in a Z-axis direction (vertical direction or optical axis direction) of the magnet part 600 may be further provided. In this specification, the Z-axis direction is the optical axis direction or the vertical direction as a third direction. In addition, the X-axis direction is a direction perpendicular to the Z-axis direction, and is a direction from the light emitting part toward the light receiving part in the embodiment. In addition, the Y-axis direction is a direction perpendicular to the X-axis direction and the Z-axis direction. A description will be given below based on this.

The light receiving part 2 may further include an image synthesis part. The image synthesis part may include an image processor configured to receive an image signal from the image sensor IS, and process the image signal (e.g., interpolation or frame synthesis). In particular, the image synthesis part may synthesize the image signals into an image signal (high resolution) of one frame using image signals (low resolution) of the plurality of frames. In other words, the image synthesis part may synthesize a plurality of image frames included in the image signal received from the image sensor IS, and generate the synthesized result as a synthesized image. The synthesized image generated by the image synthesis part may have a resolution higher than those of the plurality of image frames output from the image sensor IS. In other words, the image synthesis part may generate a high-resolution image through the super resolution (SR) technique. The plurality of image frames may include image frames generated by being changed into different optical paths by the movement of the optical member 800. The image synthesis part may be positioned inside or outside the light receiving part 2.

The camera module 10 may include the main substrate 4 (printed circuit board (PCB)). The light emitting part 1 and the light receiving part 2 may be disposed on the main substrate 4. The main substrate 4 may be electrically connected to the light emitting part 1 and the light receiving part 2.

In addition, the camera module may include a connect part 3. The connect part 3 may be electrically connected to the main substrate 4. The connect part 3 may be connected to the configuration of the optical device. The connect part 3 may include a connector 7 connected to the configuration of the optical device. The connect part 3 may include an extension substrate 5 on which the connector 7 is disposed and connected to a connection substrate 6. The extension substrate 5 may be a PCB, but is not limited thereto.

The camera module may include the connection substrate 6. The connection substrate 6 may connect the main substrate 4 and the extension substrate 5 of the connect part 3. The connection substrate 6 may have flexibility. The connection substrate 6 may be a flexible printed circuit board (flexible PCB (FPCB)).

In addition, the main substrate 4, the connection substrate 6, and the extension substrate 5 may be formed integrally or separately.

The camera module may include a reinforcement plate 8. The reinforcement plate 8 may include a stiffener. The reinforcement plate 8 may be disposed on a lower surface of the main substrate 4. The reinforcement plate 8 may be formed of stainless steel.

The camera module (or the light receiving part) may include a lens drive device. The camera module may include a voice coil motor (VCM). The camera module may include a lens drive motor. The camera module may include a lens drive actuator. According to this configuration, as described above, the camera module according to the embodiment may perform a 3-dimensional tilt on the optical member 800. In addition, as the optical member 800 is tilted, the optical path of the input light passing through the optical member 800 may move repeatedly according to a predetermined rule.

FIG. 4 is a perspective view of some components of a light receiving part of the camera module according to the embodiment, FIG. 5 is a perspective view of a housing of the camera module according to the embodiment, and FIG. 6 is a perspective view of some components of the camera module according to the embodiment.

Referring to FIGS. 4 to 6, in the embodiment, the cover 900 may include an upper plate 910 and a side plate 920. Specifically, the cover 900 may include the upper plate 910 including a cover hole 911 and the side plate 920 extending downward from an outer circumference or edge of the upper plate 910.

The housing 100, the holder 500, and the like may be positioned inside the upper plate 910. In addition, the side plate 920 may be positioned on the side surface of the housing 100. A first stepped portion 124 of the housing 100 may be positioned at a lower end of the side plate 920.

In addition, an inner surface of the side plate 920 may be coupled to the housing 100. An adhesive member (not shown) may be disposed between the inner surface of the side plate 920 and the housing 100. Accordingly, the side plate 920 may be fixed to the housing 100. The upper plate 910 of the cover 900 may include the cover hole 911 corresponding to a holder hole 511 of the holder 500.

In addition, the cover 900 may function to support the substrate 300 and the coil part 400 so as not to be pushed by the Lorentz force. In addition, the cover 900 may function to dissipate heat generated from the coil part 400 through conduction. The side plate 920 of the cover 900 may include a bent portion in which a part of the side plate 920 is bent inward to come into contact with an outer surface of the substrate 300. The bent portion may include one or more of a pressing portion, a press-fitting portion, and a concave portion. In this embodiment, as a heat-dissipation optimization structure, the coil part 400, the substrate 300, and the cover 900 may be connected through a structure in which the bent portion comes into contact with the substrate 300 to dissipate heat generated from the coil part 400 to the outside through conduction.

The side plate 920 of the cover 900 may include a plurality of side plates. The plurality of side plates may include first to fourth side plates. The side plate 920 of the cover 900 may include a first side plate and a second side plate disposed to face each other or disposed opposite to each other, and a third side plate and a fourth side plate disposed to face each other or disposed opposite to each other between the first side plate and the second side plate. In addition, the first to fourth side plates may come into contact with first to fourth portions 301 to 304 (see FIG. 7) of the substrate 300 to be described below, respectively.

In addition, in the embodiment, the housing 100 may be disposed on the main substrate 4.

In addition, the housing 100 may accommodate the holder 500 therein. In addition, the lens module 200 may be coupled to the housing 100. The housing 100 may be coupled to a barrel of the lens module 200.

In addition, the housing 100 may be a coil case to which a coil is fixed. Accordingly, the housing 100 may be coupled to the coil part 400 and the substrate 300 connected to the coil part 400.

Specifically, the housing 100 may include the inner portion 110 to which the lens module 200 is coupled and the outer portion 120 to which the coil part 400 is coupled. The inner portion 110 and the outer portion 120 may be formed integrally or separately.

The inner portion 110 may be positioned inside the housing 100. In addition, the inner portion 110 of the housing 100 may include a hole 111. The hole 111 may be hollow. The hole 111 may pass through the housing 100 in the optical axis direction.

In addition, a screw thread 112 may be provided on an inner circumferential surface of the inner portion 110. The screw thread 112 of the inner portion 110 may be coupled to the lens module 200.

In the embodiment, the screw thread 112 may be positioned at the bottom of the inner circumferential surface of the inner portion 110. Accordingly, the top of the inner circumferential surface of the inner portion 110 may be disposed to face and be spaced apart from an outer circumferential surface of the lens module 200. In addition, the inner portion 110 of the housing 100 may include a protrusion 113. The protrusion 113 may extend upward. The protrusion 113 may prevent foreign substances from being injected into the lens module 200 positioned inside the inner portion 110.

The outer portion 120 may be disposed outside the inner portion 110. The outer portion 120 and the inner portion 110 may be formed as separate members or integrally. The outer portion 120 of the housing 100 may include a sidewall. The sidewall of the housing 100 may be disposed outside the holder 500. In addition, a coil part may be disposed on the outer portion 120.

In addition, the sidewall of the housing 100 may include a first housing sidewall to a fourth housing sidewall. The housing 100 may include a first housing sidewall and a second housing sidewall disposed opposite to each other, and a third housing sidewall and a fourth housing sidewall disposed opposite to each other between the first housing sidewall and the second housing sidewall.

In addition, the outer portion 120 of the housing 100 may include a housing hole 121. The housing hole 121 may have a shape corresponding to a shape of the coil part 400. The housing hole 121 may have an area larger than that of the coil part 400. Accordingly, the housing hole 121 may accommodate the coil part 400. In other words, the housing hole 121 may be positioned on the sidewall of the housing 100. In the embodiment, the housing hole 121 may be formed in each of the first housing sidewall to the fourth housing sidewall of the housing 100.

The housing hole 121 may include an extension groove 122 extending downward. An end of the coil part 400 may be disposed on the extension groove 122.

Specifically, the sidewall of the housing 100 may include a first groove and a second groove formed to be diagonally recessed from a lower end of the housing hole 121. In other words, the first groove and the second groove may be formed to be recessed toward the sidewall of the housing 100 adjacent to the housing hole 121. According to this configuration, an electrical connection between a wire connected to the coil part 400 and the substrate may be easily made.

In addition, a coupling protrusion 123 may be positioned on an outer surface of the housing 100 (or an outer surface of the outer portion 120). The housing 100 may be coupled to the substrate through the coupling protrusion 123. The coupling protrusion 123 may be positioned to correspond to the body portion 310 (see FIG. 7) of the substrate. A plurality of coupling protrusions 123 may be formed.

In addition, the outer portion 120 of the housing 100 may include a first stepped portion 124 and a second stepped portion 126. The first stepped portion 124 and the second stepped portion 126 may be positioned above and below the sidewall of the housing 100. In addition, the first stepped portion 124 and the second stepped portion 126 may have a structure extending outward from the outer surface of the sidewall of the housing 100. In addition, the first stepped portion 124 and the second stepped portion 126 may overlap the substrate in the optical axis direction.

The first stepped portion 124 may be disposed below a part of the substrate 300. In the embodiment, the first stepped portion 124 may be positioned below the body portion 310 of the substrate 300. In addition, the terminal portion 320 and the first stepped portion 124 may overlap each other in a direction perpendicular to the optical axis direction.

The second stepped portion 126 may be positioned on the outer surface of the housing 100 and corners of the outer surface. The second stepped portion 126 may be positioned on an upper portion of the body portion 310.

In addition, the first stepped portion 124 and the second stepped portion 126 may be formed in a shape corresponding to the substrate 300. In addition, the substrate 300 may be disposed on the outer surface of the sidewall of the housing 100 by the first stepped portion 124 and the second stepped portion 126.

In addition, the first stepped portion 124 may include a first stepped groove 125. The first stepped groove 125 may be formed in the first stepped portion 124. A foreign substance preventing member may be disposed in the first stepped groove 125. According to this configuration, it is possible to prevent foreign substances from being injected into the housing 100 from the outside. Accordingly, it is possible to improve the reliability and accuracy of the camera module according to the embodiment.

The second stepped portion 126 may be disposed to be spaced apart from the substrate 300 at an end thereof.

The outer portion 120 of the housing 100 may include a damper protrusion 127. The damper protrusion 127 may be formed on the outer surface of the outer portion 120 of the housing 100. The damper protrusion 127 may be inserted into a substrate hole 311 of the substrate 300. The damper protrusion 127 may include a plurality of protrusions.

The outer portion 120 of the housing 100 may include the damper protrusion 127 protruding toward the inside, for example, the holder 500. The damper protrusion 127 may be positioned on an inner surface of the outer portion 120.

In addition, the damper protrusion 127 may overlap the elastic member 700 to be described below in a direction perpendicular to the optical axis direction. In addition, the damper protrusion 127 may be coupled to at least a part of the elastic member 700 by a damper liquid. According to this configuration, it is possible to improve the reliability of the device and minimize the tilt of the optical member due to vibration by reducing the vibration generated upon tilting.

The outer portion 120 of the housing 100 may include a housing protrusion 128. The housing protrusion 128 may be inserted into a hole of a second coupling portion 720. Accordingly, the housing protrusion 128 may be coupled to the second coupling portion 720.

The outer portion 120 of the housing 100 may include a housing guide part 129. The housing guide part 129 may be positioned at a corner of the housing 100. The cover 900 may be seated on the housing guide part 129. In other words, the cover 900 and an uppermost portion of the sidewall 520 (e.g., an uppermost surface of the sidewall 520) may be spaced apart from each other by the housing guide part 129.

The housing protrusion 128 may be disposed more inwardly than the housing guide part 129. In other words, the housing guide part 129 may be disposed more outwardly than the housing protrusion 128. In addition, the housing guide part 129 may be disposed more outwardly than the elastic member to be described below.

The housing protrusion 128 may have a lower surface 128a positioned more downwardly than a lower surface 129a of the housing guide part 129. In other words, the lower surface 128a of the housing protrusion 128 and the lower surface 129a of the housing guide part 129 may form a stepped portion.

In addition, the housing protrusion 128 may have an upper surface positioned more downwardly than an upper surface of the housing guide part 129. In other words, the housing guide part 129 may be disposed to be spaced apart from the first protrusion of the holder to provide a space for the first protrusion to easily perform tilting within the housing 100.

A guiding part GP may be disposed outside the elastic member. In addition, the guiding part GP may protrude from the housing 100 in the optical axis direction or the third direction.

The guiding part GP may be positioned at each corner of the housing 100. In the embodiment, the guiding part GP may be disposed at the corners facing each other. In addition, the guiding part GP may be positioned between the housing guide parts 129 facing each other. For example, the guiding part GP and the housing guide part 129 may be disposed in different diagonal directions. According to this configuration, the elastic member may be coupled to the housing and the holder to minimize deformation due to tilt, impact, or the like.

The guiding part GP may be formed to protrude from the lower surface 128a of the housing protrusion 128 in the optical axis direction. For example, the guiding part GP may be positioned between the lower surface 128a of the housing protrusion 128 and the lower surface 129a of the housing guide part 129. In addition, the guiding part GP may be disposed outside the elastic member and the housing protrusion 128.

In addition, the guiding part GP may include a shape corresponding to at least a part of an outer circumference of a second coupling portion of the elastic member. In the embodiment, the second coupling portion may extend in the first direction (X-axis direction) and the second direction (Y-axis direction). Correspondingly, the guiding part GP may have a side surface GE2 extending in the first direction corresponding to the portion where the second coupling portion extends in the first direction, and a side surface GE1 extending in the second direction corresponding to the portion where the second coupling portion extends in the second direction. In other words, an inner surface of the guiding part GP may correspond to an outer surface of the second coupling portion. In particular, the inner surface of the guiding part GP may correspond to the outer circumference or outer surface of the second coupling portion that faces the inner surface. In other words, the inner surface of the guiding part GP may be formed along the edge of the second coupling portion that is adjacent thereto.

According to this structure, the position movement of the elastic member is limited by the guiding part GP of the housing 100, and deformation or the like may be blocked. In other words, the guiding part GP of the housing 100 may prevent deformation of the elastic member and fix the position to reliably maintain accurate movement of the holder connected to the elastic member or the like.

The housing 100 may include the connection portion 130. The connection portion 130 may connect the inner portion 110 and the outer portion 120. At least a part of the connection portion 130 may overlap the holder 500 in the optical axis direction. The connection portion 130 may be disposed on at least a part of the holder 500.

In addition, the housing 100 may reduce the size and reduce the number of parts through the above-described integrated structure. Furthermore, the housing 100 may be made of a non-magnetic material.

In addition, the housing 100 may include a first corner corresponding to a first corner portion of the holder 500, a second corner corresponding to a second corner portion of the holder 500, a third corner corresponding to a third corner portion of the holder 500, and a fourth corner corresponding to a fourth corner portion of the holder 500, which will be described below.

FIG. 7 is a perspective view of a substrate and a coil of the camera module according to the embodiment, and FIG. 8 is a view showing the coupling between coils and substrates of camera modules according to various embodiments.

Referring to FIGS. 7 and 8, the substrate 300 may be positioned on the outer surface of the sidewall of the housing as described above. In addition, the substrate 300 may be disposed between the side plate of the cover and the sidewall of the housing. A part of the substrate 300 may be positioned between the first stepped portion and the second stepped portion of the housing. The substrate 300 may be disposed to surround outer surfaces of four sidewalls of the housing.

In addition, the substrate 300 may be electrically connected to the coil part 400. The coil part 400 may be disposed on the inner surface of the substrate 300. In addition, the substrate 300 may be electrically connected to the main substrate to provide a signal to the coil part 400. The substrate 300 may be fixed to the housing 100, which is a coil case, so that the coil part 400 is stably fixed. The position sensor 450 configured to detect the position of the magnet part 600 may also be coupled to the substrate 300.

In addition, the substrate 300 may include an FPCB. In addition, the position sensor 450 and the coil part 400 may be surface-mounted on the substrate 300. The embodiment may provide a structure that does not require a separate part for electrically conducting the position sensor 450 as the position sensor 450 is coupled to the substrate 300.

In addition, in the embodiment, the substrate 300 is positioned outside the housing 100 so that the terminal portion 320 of the substrate 300 and the main substrate 4 may be soldered, thereby minimizing the space required for connection.

First, the substrate 300 may include the first portion 301 to the fourth portion 304. The substrate 300 may include the first portion 301 disposed on the first housing sidewall of the housing 100, the second portion 302 disposed on the second housing sidewall of the housing 100, the third portion 303 disposed on the third housing sidewall of the housing 100, and the fourth portion 304 disposed on the fourth housing sidewall of the housing 100.

The fourth portion 304 may connect the first portion 301 and the second portion 302, and the second portion 302 may connect the third portion 303 and the fourth portion 304.

In addition, the first portion 301 and the third portion 303 may be spaced apart from each other. An end of the first portion 301 and an end of the third portion 303 may be positioned on a seating portion formed to protrude from a corner where the first housing sidewall and the third housing sidewall of the housing 100 meet.

In addition, the lengths of the first portion 301 to the fourth portion 304 may be reduced in the third direction at portions that come into contact with each other. In addition, the inner surface of each contacted portion may have a curvature. Accordingly, stress may be reduced in a region where the substrate 300 is easily coupled to and bent at the outer surface of the housing 100.

More specifically, the substrate 300 may include the body portion 310. The coil part 400 may be seated on the body portion 310, and the body portion 310 may be coupled to the coil part 400. In addition, the position sensor 450 may be coupled to the body portion 310.

The body portion 310 may be disposed on the outer surface of the housing 100. The body portion 310 of the substrate 300 may include the substrate hole 311. The coupling protrusion 123 of the housing 100 may pass through the substrate hole 311. Accordingly, the substrate 300 and the housing 100 may be coupled to each other through the coupling protrusion 123 and the substrate hole 311.

In addition, the substrate 300 may include the terminal portion 320. The terminal portion 320 may extend downward from the body portion 310 and include a plurality of terminals. In other words, the terminal portion 320 may extend from the body portion 310 toward the lower main substrate. In addition, the terminal portion 320 may be coupled to the main substrate by soldering. The terminal portion 320 may be positioned between the main substrate and the body portion 310 because it is positioned on a lower portion of the substrate 300. According to this configuration, an electrical connection between the substrate 300 and the terminal portion 320 may be easily made. For example, an electrical connection between the coil part 400 and the substrate 300 may be easily made. In addition, it is possible to secure the ease of assembly by minimizing the space for electrical connection.

In addition, the terminal portion 320 may be formed to correspond to the shape of the first stepped portion 124. In the embodiment, the terminal portion 320 may be positioned between the first stepped portions 124.

The substrate 300 may include an extension 330. The extension 330 may extend upward from the body portion 310. The extension 330 may be positioned at an upper end of the substrate 300. In other words, the extension 330 may be formed to extend from the body portion 310 toward the upper plate of the cover.

The extension 330 may be formed to correspond to the shape of the second stepped portion 126. The extension 330 may be positioned between the second stepped portions 126.

In addition, the coil part 400 may be positioned on the substrate 300 and coupled to the substrate 300. The coil part 400 may be coupled to the substrate 300 through a bonding member or the like. The coil part 400 may be coupled to the inner surface of the substrate 300. In addition, the coil part 400 may be electrically connected to the substrate 300. In addition, the coil part 400 may be positioned in the housing hole of the sidewall of the housing 100.

In addition, the coil part 400 may be disposed opposite to a magnet part to be described below. That is, the coil part 400 may be disposed to face the magnet part. In addition, the coil part 400 may electromagnetically interact with the magnet part. In the embodiment, when a current is supplied to the coil part 400 to form an electromagnetic field around the coil part 400, the magnet part may be moved with respect to the coil part 400 by the electromagnetic interaction between the coil part 400 and the magnet part. The coil part 400 and the magnet part 600 may be disposed at positions opposite to each other.

In addition, the coil part 400 may include a pair of ends (lead-out wires) for supplying power. At this time, a first end 401 may be drawn out to left and lower sides of the coil part 400, and a second end 402 may be drawn out to right and lower sides of the coil part 400. The coil part 400 may include the first end 401 and the second end 402 coupled to the substrate 300. In addition, when the first end 401 and the second end 402 extend only in an upward or downward direction, both ends of the coil are concentrated in the center and thus the impact is concentrated in the central region of the coil part 400, so that the coil part is easily deformed or cracked and it is hard to manufacture the coil part, but according to the embodiment, it is possible to solve the problem.

As shown in FIG. 8A, the first end 401 and the second end 402 may be coupled to a terminal 312 of the substrate 300.

In the embodiment, the first end 401 and the second end 402 may be coupled to the terminal 312 of the substrate 300 by soldering or Ag epoxy. Accordingly, the coil part 400 may be coupled to the substrate 300.

Meanwhile, as shown in FIG. 8B, as a modified example, the first end 401 and the second end 402 may be coupled to the terminal 312 of the substrate 300 through a separate coupling member 305. The coupling member 305 may be a coil support. The coil part 400 may be surface-mounted on the substrate 300 by applying the coupling member 305. In this case, there is an advantage in that assembly convenience is increased through manual solder arrangement operability and shortening of an operating time, and there is an advantage in that the positional misalignment tolerance of the coil part 400 due to assembly compared to the manual solder is reduced. In addition, the center misalignment between the coil part 400 and the magnet part may be prevented.

The first end 401 and the second end 402 may be disposed in the extension groove 122 of the housing 100. At this time, an electrically conducting material and/or the above-described coupling member 305 connected to the first end 401 and the second end 402 may also be disposed in the extension groove 122 of the housing 100.

The coil part 400 may include a plurality of coils. The coil part 400 may include four coils. The coil part 400 may include a first coil 410 to a fourth coil 440. A current may be applied to each of the first coil 410 to the fourth coil 440. The first coil 410 to the fourth coil 440 may be electrically separated. Alternatively, the first coil 410 to the fourth coil 440 may have opposite directions of currents flowing through the coils facing each other. For example, the first coil 410 and the third coil 430 may be formed in a structure that is reversely parallel to each other, and the second coil 420 and the fourth coil 440 may be formed in a structure that is reversely parallel to each other.

In addition, the first coil 410 to the fourth coil 440 may have different directions of currents applied to the coils facing each other. Accordingly, the diagonal tilt or horizontal tilt control of the optical member may be performed.

In addition, a current may be applied to two coils facing each other among the first coil 410, the second coil 420, the third coil 430, and the fourth coil 440. Accordingly, as will be described below, the optical member tilt control may be performed in the horizontal direction. A detailed description thereof will be given below.

Specifically, the coil part 400 may include the first coil 410 facing a first magnet 601 (see FIG. 9), the second coil 420 facing a second magnet 602 (see FIG. 9), the third coil 430 facing a third magnet 603 (see FIG. 9), and the fourth coil 440 facing a fourth magnet 604 (see FIG. 9).

In addition, the first coil 410 may be disposed on the first housing sidewall of the housing. In addition, the second coil 420 may be disposed on the second housing sidewall of the housing. The third coil 430 may be disposed on the third housing sidewall of the housing. In addition, the fourth coil 440 may be disposed on the fourth housing sidewall of the housing.

In addition, in the embodiment, the four coils may be controlled by two channels. The first coil 410 and the second coil 420 may be electrically connected. However, a direction of the Lorentz force generated between the first coil 410 and the first magnet 601 and a direction of the Lorentz force generated between the second coil 420 and the second magnet 602 may be opposite to each other. For example, the first coil 410 and the second coil 420 may be disposed so that currents flow in opposite directions to each other. In the embodiment, the first coil 410 and the second coil 420 may be disposed to be wound in opposite directions.

Alternatively, the first coil 410 and the second coil 420 may be disposed to be wound in the same direction, and the polarity of the first magnet 601 and the polarity of the second magnet 602 may be arranged in different directions. Meanwhile, the first coil 410 and the second coil 420 may be electrically separated and may also be integrally controlled by a control unit.

In addition, the third coil 430 and the fourth coil 440 may be electrically connected. However, a direction of the Lorentz force generated between the third coil 430 and the third magnet 603 and a direction of the Lorentz force generated between the fourth coil 440 and the fourth magnet 604 may be opposite to each other. The third coil 430 and the fourth coil 440 may be disposed so that currents flow in opposite directions to each other. For example, the third coil 430 and the fourth coil 440 may be disposed to be wound in opposite directions. Alternatively, the third coil 430 and the fourth coil 440 may be disposed to be wound in the same direction, and the polarity of the third magnet 603 and the polarity of the fourth magnet 604 may be arranged in different directions. Meanwhile, the third coil 430 and the fourth coil 440 may be electrically separated and may also be integrally controlled by the control unit.

FIG. 9 is an exploded perspective view showing a holder, a magnet, and an optical member of the camera module according to the embodiment, FIG. 10 is an exploded perspective view showing the holder, the magnet, and the optical member of the camera module according to the embodiment, FIG. 11 is a perspective view from a different angle in FIG. 10, FIG. 12 is a top view of the holder, the magnet, and the optical member of the camera module according to the embodiment, FIG. 13 is a view for describing a Lorentz force between the magnet and the coil in the embodiment, and FIG. 14 is a view for describing a diagonal tilting control of the optical member in the embodiment.

Referring to FIGS. 9 to 14, the holder 500 may be coupled to the magnet part 600 and the optical member 800.

First, the holder 500 may include the holder hole 511 as described above. In addition, the lens module may be seated in the holder hole 511. A groove portion 511*a* extending outward may be added to the holder hole 511. The assembly tolerance may be minimized upon assembly by the groove portion 511*a*.

In addition, the holder 500 may include a sidewall groove 522, and the magnet part 600 may be disposed in the sidewall groove 522. In addition, the optical member 800 may be disposed below the holder 500. The holder 500 may move integrally with the optical member 800. For example, when the holder 500 is tilted, the optical member 800 coupled to the holder 500 may also be tilted. In addition, when the holder 500 is tilted, the magnet part 600 coupled to the holder 500 may also be tilted. The holder 500 may be a case in which the optical member 800 and the magnet part 600 are assembled.

The holder 500 may use a non-magnetic material in order to minimize the influence of a magnetic force with the magnet part 600. The holder 500 may be spaced apart from the housing 100 within the housing 100. In addition, the holder 500 may be connected to the elastic member 700. The holder 500 may be tilted by being coupled to the elastic member 700 in a first diagonal direction of the optical member 800. Since the holder 500 is a part that is actually driven, the weight (size) needs to be minimized.

The holder 500 may include a first side surface, a second side surface disposed opposite to the first side surface, and third and fourth side surfaces disposed opposite to each other between the first side surface and the second side surface. The holder 500 may include the first corner portion between the first side surface and the third side surface, the second corner portion between the second side surface and the third side surface, the third corner portion between the second side surface and the fourth side surface, and the fourth corner portion between the fourth side surface and the first side surface. The diagonal direction may be a direction from the first corner portion toward the third corner portion or a direction from the third corner portion toward the first corner portion. In addition, the diagonal direction may be a direction from the second corner portion toward the fourth corner portion or a direction from the fourth corner portion toward the second corner portion.

The holder 500 may include the base 510, the sidewall 520, and the second protrusion 530.

The base 510 may be positioned in the housing. The optical member 800 may be positioned below the base 510. In the embodiment, the base 510 may include a base groove 512 formed on a lower surface. The optical member 800 may be disposed in the base groove 512. The base groove 512 may be formed in a shape corresponding to the optical member 800. At least a part of the optical member 800 may be accommodated in the base groove 512. In addition, in the base groove 512, the optical member 800 may be coupled to the base 510 by an adhesive member.

To improve the bonding force between the base 510 and the optical member 800 by the adhesive member, coupling grooves 512*a* to 512*d* may be positioned at corners of the lower portion of the base 510.

In the embodiment, the base groove 512 may include a first coupling groove 512*a*, a second coupling groove 512*b*, a third coupling groove 512*c*, and a fourth coupling groove 512*d*. The first coupling groove 512*a* may be positioned between a first edge surface M1 and a fourth edge surface M4. In addition, the second coupling groove 512*b* may be positioned between a second edge surface M2 and a third edge surface M3. In addition, the third coupling groove 512*c* may be positioned between the second edge surface M2 and the fourth edge surface M4. In addition, the fourth coupling groove 512*d* may be positioned between the first edge surface M1 and the third edge surface M3. The first edge surface M1 to the fourth edge surface M4 may be side surfaces of the base 510 by the base groove 512.

A bonding member may be injected into the first coupling groove 512*a*, the second coupling groove 512*b*, the third coupling groove 512*c*, and the fourth coupling groove 512*d*. In the embodiment, after the optical member 800 is seated in the base groove 512, the bonding member may be injected into the first coupling groove 512*a*, the second coupling groove 512*b*, the third coupling groove 512*c*, and the fourth coupling groove 512*d*. At this time, the bonding member may spread to the lower surface of the base groove 512 through a capillary phenomenon. In other words, the bonding member may be positioned between one surface of the optical member 800 and the lower surface of the base groove 512.

In addition, the optical member 800 may be disposed to be spaced apart from the base groove 512 by a first separation distance in the third or first/second direction. The first separation distance may be 20 μm to 100 μm. There is a problem in that when the separation distance is smaller than 20 μm, the coupling force between the optical member and the holder may be lowered, and when the separation distance is larger than 100 µm, it is difficult to easily perform the capillary phenomenon by the bonding member, and the size of the holder increases.

In addition, the base 510 includes a base hole, and the base hole may be hollow. The base hole may be formed to pass through the base 510 in the optical axis direction.

The sidewall 520 may extend upward from the base 510. The sidewall 520 may be positioned on the upper surface of the base 510, and disposed along the edge of the base 510. The magnet part 600 may be fixed to the sidewall 520.

The sidewall 520 may include a first protrusion 521. The first protrusion 521 may be positioned at an upper portion of the sidewall 520. The first protrusion 521 may be coupled to the elastic member. More specifically, the first protrusion 521 may be coupled to a first coupling portion 710. In addition, the first protrusion 521 and the housing may be coupled to each other through the elastic member.

The sidewall 520 or the first protrusion 521 may include a protrusion 521a and a guide protrusion 521b. The protrusion 521a may be positioned on an upper surface of the first protrusion 521 and may protrude upward. The protrusion 521a may be coupled to the first coupling portion 710. The protrusion 521a may be inserted into a hole of the first coupling portion 710. In the embodiment, the protrusion 521a may be positioned to correspond to the first protrusion 521. The first protrusion 521 may protrude upward in a diagonal direction. In addition, corresponding to this configuration, the protrusion 521a may include a first protrusion 521a-1 and a second protrusion 521a-2. At this time, the first protrusion 521a-1 and the second protrusion 521a-2 may be disposed in the diagonal direction. For example, the first protrusion 521a-1 and the second protrusion 521a-2 may be disposed at corner portions facing each other, and disposed symmetrically in the optical axis direction.

The guide protrusion 521b may be positioned outside the protrusion 521a. In the embodiment, the guide protrusion 521b may be positioned in the diagonal direction because it is disposed on the first protrusion 521. In addition, the protrusions 521a disposed in the diagonal direction may be positioned between the guide protrusions 521b disposed in the diagonal direction. Accordingly, the elastic member 700 to be described below may be guided by the guide protrusion 521b while being coupled to the protrusion 521a. The guide protrusion 521b may guide the elastic member 700 to be seated on the first protrusion 521 of the holder 500, and prevent deformation of the elastic member 700 even when an impact occurs due to tilt or the like.

A thickness of the guide protrusion 521b may have a ratio of 1:1 to 1:2 with a thickness of the elastic member 700. There is a limit in which the deformation of the elastic member due to impact occurs when the ratio of the thickness is smaller than 1:1, and there is a problem in that a range in which the optical member is tilted is limited and a separation occurs when the ratio of the thickness is larger than 1:2. Here, the thickness means a length in the third direction.

The guide protrusion 521b may include a shape corresponding to at least a part of an outer circumference of the first coupling portion 710 disposed at the corner of the elastic member 700.

The guide protrusion 521b may include a first guide protrusion 521b-1 and a second guide protrusion 521b-2. The first guide protrusion 521b-1 and the second guide protrusion 521b-2 may be disposed to face each other. For example, the first guide protrusion 521b-1 and the second guide protrusion 521b-2 may have inner surfaces corresponding to at least a part of the outer circumference of the first coupling portion. Accordingly, the inner surfaces of the first guide protrusion 521b-1 and the second guide protrusion 521b-2 may be positioned to correspond to an outer surface of the first coupling portion. In the embodiment, the inner surfaces of the first guide protrusion 521b-1 and the second guide protrusion 521b-2 may be positioned to face the outer surface of the first coupling portion.

For example, the first coupling portion may have the outer surface extending in the first direction or the second direction. Corresponding to the outer surface of the first coupling portion, the guide protrusion 521b may have the inner surface extending in the first direction or the second direction corresponding to the outer surface of the first coupling portion. At this time, the first guide protrusion 521b-1 and the second guide protrusion 521b-2 may include at least one of the inner surface extending in the first direction or the inner surface extending in the second direction. In addition, the first guide protrusion 521b-1 and the second guide protrusion 521b-2 may be positioned outside the elastic member. According to this configuration, the guide protrusion 521b may maintain the coupling force between the elastic member and the protrusion 521a, and easily prevent the movement deformation of the elastic member.

The sidewall 520 may include the sidewall groove 522. The sidewall groove 522 may be positioned on the outer surface of the sidewall 520. The sidewall groove 522 may be positioned to correspond to the housing grooves of the first housing sidewall to the fourth housing sidewall of the housing. The magnet part 600 may be seated in the sidewall groove 522. The sidewall groove 522 may be a recess.

In other words, the sidewall groove 522 may support the magnet part 600. The magnet part 600 may be bonded to the sidewall groove 522 by an adhesive member. Accordingly, the sidewall groove 522 may fix the magnet part 600.

In addition, an adhesive groove 523 may be disposed at the upper end and/or lower end of the sidewall 520. In addition, the bonding member may be disposed in the adhesive groove 523. In the embodiment, the magnet part 600 may be seated in the sidewall groove 522, and the bonding member may be injected through the adhesive groove 523 for the fixing between the holder 500 and the magnet part 600. The bonding member may be injected between the magnet part 600 and the sidewall groove 522 by a capillary phenomenon along the adhesive groove 523. Accordingly, the bonding member may improve the coupling force between the housing and the substrate. In this case, the magnet part 600 and the sidewall groove 522 may have a second separation distance d11. The second separation distance d11 may be 20 µm to 100 µm. There is a problem in that when the second separation distance is smaller than 20 µm, the coupling force between the holder and the magnet may be lowered, and when the second separation distance is greater than 100 µm, it is difficult to easily perform the capillary phenomenon by the bonding member, and the size of the holder increases.

In addition, the bonding member may fix the magnet part 600 to the sidewall groove 522 by ultraviolet (UV) curing, thermal curing, or the like.

In addition, the stepped structure or hole in each component of the camera module as well as the holder 500 facilitates the coupling between components as an alignment mark, and finally minimizes the weight of the camera module by minimizing the volume of the component.

In the embodiment, an assembly groove 520k may be positioned on the upper surface of the sidewall 520. When the housing 100 and the holder 500 are coupled through the assembly groove 520k, the coupling position may be easily identified. Accordingly, assembly may be easily performed.

The second protrusion 530 may protrude downward from the base 510. In this specification, the upper side or the top may mean one direction in the optical axis direction or the third direction, and the lower side or the bottom may mean a direction opposite to the one direction in the optical axis direction or the third direction. Correspondingly, the upper portion may mean a region in one direction in the optical axis direction or the third direction, and the lower portion may mean a region in a direction opposite to the one direction in the optical axis direction or the third direction.

The optical axis direction or the second protrusion 530 may be positioned at the corner of the base 510. The second protrusion 530 may limit a tilt range when the optical member 800 and the holder 500 are tilted in a diagonal direction. In addition, the second protrusion 530 may be prevented from being transmitted directly to the optical member 800, the magnet part 600, or the like upon tilting. According to this configuration, the second protrusion 530 may improve the reliability of the camera module.

The magnet part 600 may be disposed on the holder 500. The magnet part 600 may be disposed on the sidewall 520 of the holder 500. The magnet part 600 may be disposed on an outer circumferential surface of the holder 500. The magnet part 600 may protrude from the outer surface of the holder 500. The magnet part 600 may be disposed to face the above-described coil part in the housing hole. In addition, the magnet part 600 may electromagnetically interact with the coil part 400.

In addition, the magnet part 600 may be a flat magnet having a flat plate shape. The present invention is not limited thereto, and the magnet part 600 may be disposed at the corner between the sidewalls 520. At this time, the magnet part 600 may be a corner magnet having a hexahedral shape with an inner side surface greater than an outer side surface.

The magnet part 600 may include a plurality of magnets. The magnet part 600 may include four magnets. The magnet part 600 may include the first magnet 601 to the fourth magnet 604. The magnet part 600 may include the first magnet 601, the second magnet 602 disposed opposite to the first magnet 601, the third magnet 603, and the fourth magnet 604 disposed opposite to the third magnet 603.

In addition, the first magnet 601 may be disposed on the first side surface of the holder 500, the second magnet 602 may be disposed on the second side surface of the holder 500, the third magnet 603 may be disposed on the third side surface of the holder 500, and the fourth magnet 604 may be disposed on the fourth side surface of the holder 500.

In the embodiment, the optical member 800 (or the holder 500) may be tilted by the Lorentz force acting on the magnet part 600 and the coil part 400 through which current flows. To generate the Lorentz force, the actuator may be largely classified into a magnet part and a coil part. When the Lorentz force is generated, the actual operation part may be the magnet part 600. However, as a modified example, the coil part 400 may be moved by the Lorentz force. To drive the magnet part 600 in upward and downward directions, as shown in FIG. 13B, the magnet part 600 may be bipolar-magnetized. In other words, the magnet part 600 may have a form in which two magnets having bipolarity are stacked.

In addition, as shown in FIG. 13C, a current generating the Lorentz force may flow through the coil part 400 in one direction (a in FIG. 13C). In addition, a current may flow through the coil part 400 in a forward direction. Meanwhile, a current may flow through the coil part 400 in the other direction opposite to the one direction (a). In other words, a current may flow through the coil part 400 in a reverse direction. In addition, by disposing an N pole in an outer region (S pole in an inner region) of an upper portion of the magnet part 600, and an S pole in an outer region (N pole in an inner region) of a lower portion thereof and flowing the current in one direction, a driving direction may act upward (FIG. 13A) according to the Lorentz force.

According to the above description, the optical member 800 may be disposed to be tilted in the diagonal direction of the optical member 800 by applying a forward current to two adjacent coils of the first coil 410 to the fourth coil 440 and applying a reverse current to the other two coils. In the embodiment, the optical member 800 may be tilted in the diagonal direction by controlling the current applied to the first coil 410 and the third coil 430. The optical member 800 may be disposed to be tilted in the diagonal direction by applying the current to two adjacent coils of the first coil 410 to the fourth coil 440. The optical member 800 may include a first edge disposed at a position corresponding to the first corner portion of the holder 500. At this time, the first edge of the optical member 800 may be tilted upward from the optical axis by the first coil 410 and the third coil 430. The optical member 800 may include a third edge disposed at a position corresponding to the third corner portion of the holder 500. At this time, the third edge of the optical member 800 may be tilted downward from the optical axis by the second coil 420 and the fourth coil 440, and the first edge of the optical member 800 may be further tilted upward from the optical axis by the second coil 420 and the fourth coil 440.

In the embodiment, a tilting driving principle of the camera module is as follows. Four drive parts using the Lorentz force may be applied to the camera module. As shown in FIG. 14, when a Lorentz force is generated in a 'positive (+) direction' in a first drive part including the first coil 410 and the first magnet 601 and a third drive part including the third coil 430 and the third magnet 603, and a Lorentz force is generated in a 'negative (−) direction' in a second drive part including the second coil 420 and the second magnet 602 and a fourth drive part including the fourth coil 440 and the fourth magnet 604, an upper left diagonal line may be tilted upward (a1 in FIG. 14), and conversely, a lower right diagonal line may be tilted downward (a2 in FIG. 14). Thereafter, a Lorentz force may be generated in a 'positive (+) direction' in the second drive part including the second coil 420 and the second magnet 602 and the third drive part including the third coil 430 and the third magnet 603, and a Lorentz force may be generated in a 'negative (−) direction' in the first drive part including the first coil 410 and the first magnet 601 and the fourth drive part including the fourth coil 440 and the fourth magnet 604. In this case, an upper right diagonal line may be tilted upward (a3 in FIG. 14), and conversely, a lower left diagonal line may be tilted downward (a4 in FIG. 14).

Next, a Lorentz force may be generated in a 'negative (−) direction' in the first drive part including the first coil 410 and the first magnet 601 and the third drive part including the third coil 430 and the third magnet 603, and a Lorentz force may be generated in a 'positive (+) direction' in the second drive part including the second coil 420 and the second magnet 602 and the fourth drive part including the fourth coil 440 and the fourth magnet 604. In this case, the lower right diagonal line may be tilted upward (a5 in FIG. 14), and conversely, the upper left diagonal line may be tilted downward (a6 in FIG. 14).

Next, a Lorentz force may be generated in a 'negative (−) direction' in the second drive part including the second coil 420 and the second magnet 602 and the third drive part including the third coil 430 and the third magnet 603, and a Lorentz force may be generated in a 'positive (+) direction' in the first drive part including the first coil 410 and the first magnet 601 and the fourth drive part including the fourth coil 440 and the fourth magnet 604. In this case, the lower left diagonal line may be tilted upward (a7 in FIG. 14), and conversely, the upper right diagonal line may be tilted downward (a8 in FIG. 14). The positive direction used above may be an upward direction, and the negative direction may be a downward direction. In this embodiment, the tilting driving may be sequentially performed in four directions (upper left, upper right, lower right, and lower left).

In this embodiment, it is possible to control the force of each of the drive parts by applying the drive parts to four places, which is advantageous for precise control. Meanwhile, since the tilting is performed in an up/down symmetry, a tilting distance may be reduced.

The elastic member 700 may be connected to the housing 100. The elastic member 700 may connect the holder 500 and the housing 100. The elastic member 700 may have elasticity. Alternatively, the elastic member 700 may include a portion having elasticity. In the embodiment, the elastic member 700 may include a leaf spring. The elastic member 700 may be made of a metallic material.

The elastic member 700 may be assembled to the housing protrusion 128 of the housing 100 and the protrusion 521a of the first protrusion 521 of the holder 500 and then fixed thereto by bonding. In this embodiment, since the assembled and fixed portion of the elastic member 700 is positioned outside, the elastic member 700 may have a relatively easy assembly structure. In this embodiment, the elastic member 700 may have a structure capable of having up/down degrees of freedom for a spring position. In each embodiment, the elastic member 700 may be positioned only at the upper side, positioned at both the upper and lower sides, or positioned only at the lower side.

The elastic member 700 may include the first coupling portion 710 and the second coupling portion 720.

The first coupling portion 710 may be coupled to the corner of the holder 500. Two first coupling portions 710 may be provided. The first coupling portion 710 may be disposed to be symmetrical to the optical axis in the first diagonal direction of the optical member 800. The two first coupling portions may be disposed opposite to each other with respect to the optical axis. The first coupling portion 710 may be coupled to each of the first corner portion of the holder 500 and the third corner portion of the holder 500.

The second coupling portion 720 may be coupled to the corner of the housing 100 corresponding to another corner portion of the holder 500 adjacent to the corner portion of the holder 500 to which the first coupling portion 710 is coupled.

In addition, the second coupling portion 720 may be coupled to the housing protrusion 128 of the housing 100. In the embodiment, two second coupling portions 720 may be provided.

The second coupling portion 720 may be disposed to be symmetrical to the optical axis in a second diagonal direction different from the first diagonal direction of the optical member 800. The second coupling portions 720 may be disposed opposite to each other with respect to the optical axis. The second coupling portion 720 may be coupled to each of the second corner of the housing 100 and the fourth corner of the housing 100.

The protrusion 520a of the holder 500 and the housing protrusion 128 of the housing 100 may be disposed to at least partially overlap in the first direction (X-axis direction) or in the second direction (Y-axis direction). In the embodiment, the center of the protrusion 520a and the center of the housing protrusion 128 may be misaligned in the first direction (X-axis direction) or in the second direction (Y-axis direction). Accordingly, the center of the protrusion 520a and the center of the housing protrusion 128 may not overlap in the first direction (X-axis direction) or in the second direction (Y-axis direction). Accordingly, even when the holder 500 is seated inside the housing 100, the coupling force between the housing 100 and the holder 500 is generated by the elastic member 700, and impact or vibration may be easily blocked. As described above, the holder 500 and the housing 100 may be connected and fixed to each other through the elastic member 700.

The elastic member 700 may include an elastic connection part 730. The elastic connection part 730 may connect the first coupling portion 710 and the second coupling portion 720. The elastic connection part 730 may elastically connect the first coupling portion 710 and the second coupling portion 720. The elastic connection part 730 may have elasticity. The elastic connection part 730 may include a bent portion 731. The bent portion 731 may be a portion that is not formed by folding, but is formed in a zigzag shape. The elastic connection part 730 may include a bent portion or a rounded portion. The plurality of bent portions 731 may be continuously formed in a longitudinal direction of the elastic connection part 730.

The elastic member 700 may be coupled to the housing 100 and the holder 500 on the upper portion of the housing 100 and the upper portion of the holder 500.

In addition, the elastic member 700 may be formed in various shapes to find an optimal shape and stiffness.

In the embodiment, the bent portion 731 of the elastic connection part 730 may be formed to be flat in a region corresponding to the damper protrusion 127 of the housing 100 (e.g., a region facing each other). In addition, the damper protrusion 127 may be coupled to the adjacent elastic connection part 730 through a damper member dp. Accordingly, the elastic member 700 may also vibrate due to the tilt of the holder 500 and the optical member 800. At this time, the damper member dp may easily reduce the vibration of the elastic member 700, thereby improving the reliability of the device. The damper member dp may be made of a material that is cured by ultraviolet rays or heat.

In addition, the elastic connection part 730 may be formed to be rounded at a point where the elastic connection part 730 meets the first coupling portion 710 and the second coupling portion 720.

In a modified example, as shown in FIG. 17, the elastic connection part 730 may include a plurality of bent portions 731. The elastic connection part 730 may include an elastic protrusion 732. In addition, a plurality of damper protrusions 127-1 and 127-2 of the housing 100 may be provided. At this time, the damper protrusions 127-1 and 127-2 may at least partially overlap the elastic protrusion 732 in the first direction (X-axis direction) or the second direction (Y-axis direction). In addition, the elastic protrusion 732 and the damper protrusions 127-1 and 127-2 may be coupled to each other by the damper member dp. The damper protrusions 127-1 and 127-2 may prevent the damper member dp from flowing to regions other than the damper protrusions 127-1 and 127-2. In addition, it is possible to minimize the influence of the damper member dp on the stiffness of the elastic member 700.

In addition, the elastic member 700 may have different diagonal directions connected to the holder or the housing depending on the arrangement position such as a lower portion or upper portion of the holder 500. Accordingly, it is possible to prevent the tilt of the holder 500 in an initial state, and perform diagonal direction control with the same current.

In addition, in the embodiment, the elastic member 700 may distribute stress in the first direction (X-axis direction), the second direction (Y-axis direction), and the third direction (Z-axis direction) so that deformation due to stress from external impacts does not occur. For example, the elastic member 700 may have a safety factor greater than or equal to 2 in the first direction (X-axis direction), the second direction (Y-axis direction), and the third direction (Z-axis direction).

In addition, the elastic connection part 730 may be positioned on each of the first side surface, the second side surface, the third side surface, and the fourth side surface of the holder 500 to be symmetrically disposed. In other words, the elastic connection part 730 of the elastic member 700 may have the same shape when moving by 90 degrees in a clockwise direction or a counterclockwise direction. Accordingly, the tilting (e.g., diagonal tilting) of the holder 500 may be performed symmetrically.

Additionally, each of the first coupling portion 710 and the second coupling portion 720 has first and second coupling holes for coupling with the protrusion 521a and the housing protrusion 128, and the first and second coupling holes may further include coupling grooves formed to extend toward the adjacent elastic connection part 730. The coupling grooves may minimize deformation of the elastic member 700 due to external impacts by absorbing the external impacts.

In the embodiment, the stiffness of the elastic member 700 may range from 53 mN/mm to 80 mN/mm. At this time, the stiffness of the elastic member 700 may be the stiffness of the elastic connection part 730 of the elastic member 700. When the stiffness of the elastic member 700 is less than 53 mN/mm, there is a problem that the tilting angle is larger than a target tilting angle even when the level of the current is reduced when referring to a measured value in an analyzing operation, and 80 mN/mm may be the largest value in a limited space in this embodiment.

In addition, in this embodiment, the level of the current applied to the coil part 400 may range from 18 mA to 22 mA. When the current applied to the coil part 400 is less than 18 mA, there is a problem that the tilting angle is small when the stiffness of the elastic member 700 is 53 mN/mm upon the analyzing operation test when the current applied to the coil part 400 is less than 18 mA, and there is a limit that when the current exceeds 22 mA, the consumption of current is large, and heat is generated in the coil.

In addition, the housing 100 may include a stopper configured to limit a tilting range of the holder 500 in the first direction (X-axis direction) or the second direction (Y-axis direction). The stopper may be positioned on the inner surfaces of the first housing sidewall to the fourth housing sidewall. In addition, the stopper may protrude inward.

In the embodiment, the stopper may include a first stopper ST1 and a second stopper ST2. In addition, the first stopper ST1 and the second stopper ST2 may be positioned on the inner surface of the outer portion 120 of the housing 100.

The first stopper ST1 may be positioned on the second housing sidewall or the fourth housing sidewall. In addition, the second stopper ST2 may be positioned on the first housing sidewall or the fourth housing sidewall. According to this configuration, the first stopper ST1 may limit a rotation range of the holder 500 in the second direction (Y-axis direction). In addition, the second stopper ST2 may limit a rotation range of the holder 500 in the first direction (X-axis direction). Accordingly, it is possible to prevent deformation of the elastic member 700 by minimizing the stress applied to the elastic member 700 depending on the separation distance between the housing 100 and the holder 500.

In addition, the stopper may further include a third stopper ST3. The third stopper ST3 may be positioned on the upper surface of the connection portion 130. In addition, the third stopper ST3 may be formed to protrude upward. Accordingly, the third stopper ST3 may limit a rotation range of the holder 500 in the third direction (Z-axis direction). Accordingly, it is possible to prevent deformation of the elastic member 700 by minimizing the stress applied to the elastic member 700 depending on the separation distance between the housing 100 and the holder 500.

As a further modified example, the camera module may have an elastic member disposed on the lower portion. Hereinafter, this will be described as a lower elastic member. The lower elastic member may be coupled to the lower portion of the housing 100 and the lower portion of the holder 500. The lower elastic member includes a first coupling region coupled to the lower portion of the holder 500, a second coupling region coupled to the lower portion of the housing 100, and a connection region connecting the first coupling region and the second coupling region.

The first coupling region of the lower elastic member may be coupled to another corner of the holder 500 (a corner different from the corner connected between the upper elastic member and the holder). The first coupling region of the lower elastic member may also be coupled to the second protrusion of the holder 500. For example, in the embodiment, the upper elastic member and the lower elastic member may be coupled in different diagonal directions. In other words, the diagonal direction connecting a portion to which the upper elastic member is coupled and the diagonal direction connecting a portion to which the lower elastic member is coupled may be different. Accordingly, it is possible to prevent the tilt in the initial state of the holder 500, and control the tilt at the same current in all four diagonal directions.

FIG. 18 is a perspective view of the camera module according to the embodiment, FIG. 19 is a cross-sectional view taken along line EE' in FIG. 18, FIG. 20 is a cross-sectional view taken along line FF' in FIG. 18, and FIG. 21 is a cross-sectional view taken along line GG' in FIG. 18.

Referring to FIGS. 18 to 21, as described above, the first protrusion 521 may be positioned in the first diagonal direction in the holder 500, and may not be positioned in the second diagonal direction. In the embodiment, the sidewall 520 of the holder 500 may have a different length in the third direction at each corner portion. In other words, the length of the sidewall of the holder 500 at the first corner portion and the third corner portion may be larger than the length thereof at the second corner portion and the fourth corner portion. The first protrusion 521 may be positioned, for example, only at the first corner portion and the third corner portion in the first diagonal direction.

In addition, the first protrusion 521 may be disposed to be spaced apart from the upper surface of the housing 100 by a first distance d1 in the third direction. For example, when the protrusion 521a is disposed on the first protrusion 521, the upper surface of the protrusion 521a and the uppermost surface of the housing 100 may be disposed to be spaced apart from each other by the first distance d1.

In addition, since the first protrusion 521 is disposed to be spaced apart from the upper surface of the housing 100 by the first distance d1 in the third direction, the holder 500 may be easily tilted in the space by the first distance d1 in the diagonal direction.

The holder 500 may rotate at a first angle θ₁ in the first diagonal direction. Since the first angle θ₁ includes both positive/negative (+/−), STEP1 and STEP3 (or STEP2 and STEP4) may be performed as will be described below.

In addition, the holder 500 may rotate at a second angle θ₂ in the second diagonal direction. Since the second angle θ₂ includes both positive/negative (+/−), STEP2 and STEP4 (or STEP1 and STEP3) may be performed as will be described below.

The first distance d1 may be determined by Equation 1 below.

$$L \times \tan(0.75 \times \theta) \leq \text{first distance} \leq L \times \tan(1.25 \times \theta) \quad \text{[Equation 1]}$$

(where L refers to the maximum length of the base, and θ refers to the maximum tilting angle of the holder in the diagonal direction)

θ may also correspond to the tilting angle of the holder required to perform STEP1 to STEP4 to be described below in order to obtain an SR image.

When the first distance is smaller than L×tan(0.75×θ), there is a problem in that when the holder is tilted, interference between the holder and the housing occurs, thereby degrading the reliability of the device. For example, the elastic member may be damaged due to an overshoot by the elastic member.

In addition, when the first distance is larger than L×tan (1.25×θ), there is a limit in that the overall height of the camera module increases because the size of the housing increases.

FIG. 22 is a view for describing a driving sequence of the coil part.

A driver positioned on the substrate may generate a first output signal and a second output signal generated according to a trigger signal received from the image sensor. The first output signal may be input to the first coil and the third coil, and the second output signal may be input to the second coil and the fourth coil.

The trigger signal may be a square wave signal in which a pulse is generated at a constant period. A pulse interval of the trigger signal, that is, a pulse period may be one image frame interval. An interval from s rising edge of the pulse of the trigger signal to s rising edge of the next pulse thereof may be an interval of one image frame. A pulse width of the trigger signal may be set to be smaller than the interval of one image frame.

Before the driving sequence of the coil part starts, that is, in a default state, the levels of currents of the first output signal and the second output signal may be a 0 level. Here, the 0 level may mean a current of 0 A, but is not limited thereto.

When the driving sequence of the coil part starts, the levels of currents of the first output signal and the second output signal are controlled after a delay time Delay T set based on a falling edge of the pulse of the trigger signal elapses. The levels of currents of the first output signal and the second output signal may be controlled for each frame interval. The first output signal and the second output signal may be controlled to have a high-level current or a low-level current for each frame interval. The high-level current may mean a state having a current value larger than that of a reference level current, and the low-level current may mean a state having a current value smaller than that of the reference level current. For example, when the reference level is set to 0 A, the high-level may mean a current having a (+) value, and the low-level may mean a current having a (−) value. When the current level of the output signal is different in successive steps, it may take a predetermined time to increase or decrease the current level.

Table 1 below is a table showing the first output signal and the second output signal shown in FIG. 22.

TABLE 1

| STEP | First output signal (X) | Second output signal (Y) |
|------|-------------------------|--------------------------|
| 1    | (−)                     | (+)                      |
| 2    | (+)                     | (+)                      |
| 3    | (+)                     | (−)                      |
| 4    | (−)                     | (−)                      |

In Table 1, (−) refers to a low-level current, and (+) refers to a high-level current. STEP 1 refers to a first tilt sequence, STEP 2 refers to a second tilt sequence, STEP 3 refers to a third tilt sequence, and STEP 4 refers to a fourth tilt sequence. When the driving sequence of the coil part is started, the levels of currents of the first output signal and the second output signal may be controlled after a delay time set at a falling edge of a first pulse elapses (STEP 1). The first output signal may be controlled from the reference level current to the low-level current. The second output signal may be controlled from the reference level current to the high-level current. In other words, STEP 1 may control the first output signal to have the low-level current and the second output signal to have the high-level current. After a delay time set at a falling edge of a second pulse elapses, the levels of currents of the first output signal and the second output signal may be controlled (STEP 2). The first output signal may be controlled from the low-level current controlled in STEP 1 to the high-level current. The second output signal may be controlled to maintain the high-level current controlled in STEP 1. In other words, STEP 2 may control the first output signal to have the high-level current and the second output signal to have the high-level current.

After a delay time set at a falling edge of a third pulse elapses, the levels of currents of the first output signal and the second output signal may be controlled (STEP 3). The first output signal may be controlled to maintain the high-level current controlled in STEP 2. The second output signal may be controlled from the high-level current controlled in STEP 2 to the low-level current. In other words, STEP 3 may control the first output signal to have the high-level current and the second output signal to have the low-level current.

After a delay time set at a falling edge of a fourth pulse elapses, the levels of currents of the first output signal and the second output signal may be controlled (STEP 4). The first output signal may be controlled from the high-level current controlled in STEP 3 to the low-level current. The second output signal may be controlled to maintain the low-level current controlled in STEP 3. In other words, STEP 4 may control the first output signal to have the low-level current and the second output signal to have the low-level current.

STEP 1 to STEP 4 operate as one cycle, and may be continuously repeated while the driving sequence of the coil part is operated.

Table 2 below shows another example of the driving sequence of the coil part.

TABLE 2

| STEP | First output signal (X) | Second output signal (Y) |
|---|---|---|
| 1 | (+) | (+) |
| 2 | (+) | (−) |
| 3 | (−) | (−) |
| 4 | (−) | (+) |

As shown in Table 2, the levels of currents for each STEP of the first output signal and the second output signal described with reference to Table 1 and FIG. 22 are only one embodiment and may be set in other combinations. To this end, the levels of currents for each STEP of the first output signal and the second output signal may be set by a control signal of a driver on the substrate. FIGS. 23 to 25 show an optical path moving process according to the embodiment. First, in STEP 0 (neutral sequence) before the driving sequence of the coil part is started, the optical member may be maintained in a state of not being tilted. FIG. 24A shows an optical path of input light in STEP 0. In FIG. 24, a dot represents the center of a pixel with respect to the input light. In STEP 0, the center of the pixel with respect to the input light and the center of the pixel with respect to the sensor may match with each other. In other words, it means that the optical path of light passing through the optical member does not change.

When the driving sequence of the coil part is started, the optical member may be tilted according to STEP 1. Due to the tilting according to STEP 1, an upper left portion of the optical member may move upward and a lower right portion thereof may move downward with respect to a reference plane. The reference plane may refer to a plane on which the optical member is disposed in STEP 0. Moving upward may refer to moving away from the sensor, and moving downward may refer to getting closer to the sensor. FIG. 24B shows an optical path of input light in STEP 1. When the optical member is tilted according to STEP 1, the optical path of the input light may move left 0.25 pixels and up 0.25 pixels from a reference optical path. Then, the camera module according to the embodiment of the present invention may acquire a first frame image from the optical path moved according to STEP 1.

After the driving sequence of the coil part according to STEP 1, the optical member may be tilted according to STEP 2. Due to the tilting according to STEP 2, the upper right portion of the optical member may move upward and the lower left portion thereof may move downward with respect to the reference plane. Edges of the upper left portion and the lower right portion of the optical member moving upward or downward in STEP 1 may be moved to reference positions. FIG. 24C shows an optical path of input light in STEP 2. When the optical member is tilted according to STEP 2, the optical path of the input light may move right 0.25 pixels and up 0.25 pixels from the reference optical path. In STEP 1, the optical path of the input light may move right 0.5 pixels with respect to the optical path of the input light. Then, the camera module according to the embodiment of the present invention may acquire a second frame image from the optical path moved according to STEP 2.

After the driving sequence of the coil part according to STEP 2, the optical member may be tilted according to STEP 3. Due to the tilting according to STEP 3, the upper left portion of the optical member may move downward and the lower right portion thereof may move upward with respect to the reference plane. Edges of the upper right portion and the lower left portion of the optical member moving upward or downward in STEP 2 may be moved to the reference positions. FIG. 24D shows an optical path of input light in STEP 3. When the optical member is tilted according to STEP 3, the optical path of the input light may move right 0.25 pixels and down 0.25 pixels from the reference optical path. In STEP 2, the optical path of the input light may move down 0.5 pixels with respect to the optical path of the input light. Then, the camera module according to the embodiment of the present invention may acquire a third frame image from the optical path moved according to STEP 3.

After the driving sequence of the coil part according to STEP 3, the optical member may be tilted according to STEP 4. Due to the tilting according to STEP 4, the upper right portion of the optical member may move upward and the lower left portion thereof may move downward with respect to the reference plane. Edges of the upper left portion and the lower right portion of the optical member moving upward or downward in STEP 3 may be moved to reference positions. FIG. 24E shows an optical path of input light in STEP 4. When the optical member is tilted according to STEP 4, the optical path of the input light may move left 0.25 pixels and down 0.25 pixels from the reference optical path. In STEP 2, the optical path of the input light may move left 0.5 pixels with respect to the optical path of the input light. Then, the camera module according to the embodiment of the present invention may acquire a fourth frame image from the optical path moved according to STEP 4.

Although the embodiment has been described as the VCM structure to which the magnet and the coil are applied, the present invention is not limited thereto, and the present invention may also be implemented through a variable lens such as a liquid lens capable of controlling the optical path through the control of one or two or more liquid (conductive liquid and non-conductive liquid forming a mutual interface) or an optical member configured to control the optical path by controlling a thin film and a liquid.

FIG. 26 is a view for describing an SR image.

FIG. 26 shows a process of generating one high-resolution SR image using the first to fourth frame images generated through STEP 1 to STEP 4. In FIG. 26, for convenience of description, it is assumed that each of the first to fourth frame images is a frame image having a size of 4×4, that is, an image composed of 16 pixels.

As shown in FIG. 26, one SR image may be generated by disposing pixel values of four frame images corresponding to the moving direction of the optical path. In other words, the first to fourth frame images having the size of 4×4 (16 pixels) may be one SR image having a size of 8×8 (64 pixels).

A process of disposing the pixel values will be described by assuming that an upper left pixel of the first to fourth frames is Pixel 1 and a lower right pixel thereof is Pixel 16, and assuming that an upper left pixel of the SR image is Pixel 1 and a lower right pixel thereof is Pixel 64.

The Pixel 1 of the first frame image moving left 0.25 pixels and up 0.25 pixels from the reference optical path may be disposed as a value of the Pixel 1 of the SR image. The Pixel 2 of the first frame image may be disposed as a value of Pixel 3 of the SR image. The Pixel 3 of the first frame image may be disposed as a value of Pixel 5 of the SR image. The Pixel 4 of the first frame image may be disposed as a value of Pixel 7 of the SR image.

The Pixel 1 of the second frame image moving right 0.25 pixels and up 0.25 pixels from the reference optical path may be disposed as the value of Pixel 2 of the SR image. The Pixel 2 of the second frame image may be disposed as a value of Pixel 4 of the SR image. The Pixel 3 of the second frame image may be disposed as a value of Pixel 6 of the SR image. The Pixel 4 of the second frame image may be disposed as a value of Pixel 8 of the SR image.

The Pixel 1 of the third frame image moving right 0.25 pixels and down 0.25 pixels from the reference optical path may be disposed as a value of Pixel 9 of the SR image. The Pixel 2 of the third frame image may be disposed as a value of Pixel 11 of the SR image. The Pixel 3 of the third frame image may be disposed as a value of Pixel 13 of the SR image. The Pixel 4 of the third frame image may be disposed as a value of Pixel 15 of the SR image.

The Pixel 1 of the fourth frame image moving left 0.25 pixels and down 0.25 pixels from the reference optical path may be disposed as a value of Pixel 10 of the SR image. The Pixel 2 of the fourth frame image may be disposed as a value of Pixel 12 of the SR image. The Pixel 3 of the fourth frame image may be disposed as a value of Pixel 14 of the SR image. The Pixel 4 of the fourth frame image may be disposed as a value of Pixel 16 of the SR image.

As described above, the pixel values of the first to fourth frame images may be disposed to generate one SR image. In other words, one image is acquired through four images. Accordingly, images of 100 FPS may be SR images of 25 FPS.

Meanwhile, the image synthesis part may correct the SR image by removing the outermost pixel of the SR image, that is, a pixel value shaded in FIG. 26. The pixel values disposed at the outermost portion of the SR image may include data irrelevant to information to be captured in the tilting process. The image synthesis part may remove the shaded portion of the outermost pixel in order to remove the data irrelevant to information to be captured.

FIG. 27 is a perspective view of the camera module according to the embodiment, FIG. 28 is a cross-sectional view taken along line HH' in FIG. 27, FIG. 29 is a cross-sectional view taken along line II' in FIG. 27, and FIG. 30 is a cross-sectional view taken along line Jr in FIG. 27.

Referring to FIGS. 27 to 30, as described above, the first protrusion 521 may be positioned in the first diagonal direction in the holder 500, and may not be positioned in the second diagonal direction. In the embodiment, the sidewall 520 of the holder 500 may have a different length in the third direction at each corner portion. In other words, the length of the sidewall of the holder 500 at the first corner portion and the third corner portion may be larger than the length thereof at the second corner portion and the fourth corner portion. The first protrusion 521 may be positioned, for example, only at the first corner portion and the third corner portion in the first diagonal direction.

In addition, the first protrusion 521 may be disposed to be spaced apart from the upper surface of the housing 100 by the first distance d1 in the third direction. For example, when the protrusion 521a is disposed on the first protrusion 521, the upper surface of the protrusion 521a and the uppermost surface of the housing 100 may be disposed to be spaced apart from each other by the first distance d1.

As described above, since the first protrusion 521 is disposed to be spaced apart from the upper surface of the housing 100 (or the upper plate of the cover) by the first distance d1 in the third direction, the holder 500 may be easily tilted in the space by the first distance d1 in the horizontal direction.

In addition, the holder 500 may move in the horizontal direction other than the diagonal direction. In other words, the holder 500 may move in any one of the first direction and the second direction. An operation in which the holder 500 moves in the horizontal direction will be described below with reference to FIG. 31.

Even when the holder 500 moves in the horizontal direction, the holder 500 may be spaced apart from the first protrusion 521 and the upper surface of the housing 100 (or the upper plate of the cover 900) by the first distance d1.

At this time, the maximum length L of the base and the maximum tilting angle of the holder θ in the diagonal direction as described above may be determined by a horizontal length L1 of the base, a maximum tilting angle $\theta_3$ of the holder in the horizontal direction, and Equation 2 below.

$$L*\theta = L1*\theta_3 \quad \text{[Equation 2]}$$

The first distance d1 is determined by Equation 3 below.

$$L \times \tan\left(0.75 \times L1 \times \frac{\theta 3}{L}\right) \le \text{first distance} \le L \times \tan\left(1.25 \times L1 \times \frac{\theta 3}{L}\right) \quad \text{[Equation 3]}$$

(where L refers to the maximum length of the base, θ refers to the maximum tilting angle of the holder in the diagonal direction, L1 refers to the length of the base in the horizontal direction, and $\theta_3$ refers to the maximum tilting angle of the holder in the horizontal direction)

The tilting angle of the holder in the horizontal direction may correspond to the tilting angle of the holder required to perform STEP1 to STEP4, which will be described below, to obtain an SR image.

When the first distance is smaller than $$L \times \tan\left(0.75 \times L1 \times \frac{\theta 3}{L}\right),$$

there is a problem in that when the holder is tilted, interference between the holder and the housing occurs, thereby degrading the reliability of the device. For example, the elastic member may be damaged due to an overshoot by the elastic member.

In addition, when the first distance is larger than $$L \times \tan\left(1.25 \times L1 \times \frac{\theta 3}{L}\right),$$

there is a limit in that the overall height of the camera module increases because the size of the housing increases.

FIG. 31 is a view for describing the driving of a camera module according to another embodiment, FIG. 32 is a view showing an optical path moving process according to another embodiment, and FIG. 33 is a conceptual diagram conceptually and sequentially showing a plurality of images acquired for an SR technique from the camera module according to another embodiment.

Referring to FIGS. 31 to 33, the camera module according to this embodiment may acquire a plurality of images for the SR technique even by the horizontal tilting in addition to the above-described diagonal tilting.

In STEP 0 (neutral sequence) before the driving sequence of a tilt actuator is started, the optical member (or filter) may be maintained in a state of not being tilted. FIG. 33A shows an optical path of input light in STEP 0. In FIG. 33, a dot represents the center of a pixel with respect to the input light. In STEP 0, the center of the pixel with respect to the input light and the center of the pixel with respect to the sensor may match with each other. In other words, it means that the optical path of the light passing through the optical member (or filter) does not change.

When the driving sequence of the tilt actuator is started, the tilt actuator may tilt the optical member (or filter) in the horizontal direction according to STEP 1. Due to the tilting according to STEP 1, the left portion of the optical member (or filter) may move downward, and the right portion thereof may move upward with respect to the reference plane. The reference plane may refer to a plane on which the optical member (or filter) is disposed in STEP 0. Moving upward may refer to moving away from the sensor, and moving downward may refer to getting closer to the sensor. FIG. 33B shows an optical path of input light in STEP 1. When the optical member (or filter) is tilted according to STEP 1, the optical path of the input light may move right 0.25 pixels from the reference optical path. The movement of the pixel may be changed according to the SR technique or according to the sensor. In other words, it should be understood that the movement distance of the pixel relative to the reference optical path may be changed by the driving sequence of the tilt actuator.

First, the first frame image may be acquired from the optical path moved according to STEP 1.

After the driving sequence of the tilt actuator according to STEP 1, the tilt actuator may tilt the optical member (or filter) according to STEP 2. Due to the tilting according to STEP 2, the upper portion of the optical member (or filter) may move upward and the lower portion thereof may move downward with respect to the reference plane.

FIG. 33C shows an optical path of input light in STEP 2. When the optical member (or filter) is tilted according to STEP 2, the optical path of the input light may move up 0.25 pixels from the reference optical path. In STEP 1, the optical path of the input light may move up 0.25 pixels with respect to the optical path of the input light. Then, the camera module according to the embodiment of the present invention may acquire a second frame image from the optical path moved according to STEP 2.

After the driving sequence of the tilt actuator according to STEP 2, the tilt actuator may tilt the optical member (or filter) according to STEP 3. Due to the tilting according to STEP 3, the left side of the optical member (or the filter) may move upward and the right side thereof may move downward with respect to the reference plane. FIG. 33D shows the optical path of the input light in STEP 3. When the optical member (or filter) is tilted according to STEP 3, the optical path of the input light may move left 0.25 pixels from the reference optical path. In STEP 2, the optical path of the input light may move left 0.25 pixels with respect to the optical path of the input light. Then, the camera module according to the embodiment of the present invention may acquire the third frame image from the optical path moved according to STEP 3.

After the driving sequence of the tilt actuator according to STEP 3, the tilt actuator may tilt the optical member (or filter) according to STEP 4. Due to the tilting according to STEP 4, the lower end of the optical member (or the filter) may move upward and the upper end thereof may move downward with respect to the reference plane. FIG. 33E shows an optical path of input light in STEP 4. When the optical member (or filter) is tilted according to STEP 4, the optical path of the input light may move down 0.25 pixels from the reference optical path. In STEP 2, the optical path of the input light may move down 0.25 pixels with respect to the optical path of the input light. Then, the camera module according to the embodiment of the present invention may acquire the fourth frame image from the optical path moved according to STEP 4. FIGS. 34 and 35 are views showing tilt application examples of the camera module according to the embodiment.

Referring to FIGS. 34 and 35, the camera module according to the embodiment may control the optical member (or filter) to be tilted in the diagonal or horizontal direction as described above. The tilt control may be changed according to the image sensor in the camera module.

In the embodiment, the image sensor may be configured in a structure in which a plurality of pixels are arranged in an array form. For example, the image sensor is an active pixel sensor (APS), and may be a complementary metal oxide semiconductor (CMOS) sensor. In addition, the image sensor may be a charge coupled device (CCD) sensor. In addition, the image sensor may include a ToF sensor configured to receive infrared rays reflected from the subject to measure the distance using a time or a phase difference.

A pixel PX may include a first pixel and a second pixel. The first and second pixels may be alternately disposed in a row direction and a column direction. In other words, based on one first pixel, a plurality of second pixels may be disposed adjacent to the first pixel in the row direction and the column direction. For example, in the image sensor, the first pixel and the second pixel may be disposed in a checkerboard pattern.

Any one of the first pixel and the second pixel may not receive light. In the embodiment, the plurality of pixels may include an effective region AR in which the light receiving element is disposed and an ineffective region IAR that is a region other than the effective region. The effective region AR may receive light to generate a predetermined electric signal, and the ineffective region IAR may be a region that does not generate an electric signal by receiving light, or does not receive light. In other words, the ineffective region IAR may include a case in which an electrical signal by light may not be generated even when the light receiving element is positioned therein. Although the description is made below based on this, as another embodiment, the first pixel and the second pixel may be pixels that receive light having different wavelength bands as peak wavelengths. For example, the first pixel may receive light having an infrared band as a peak wavelength. In addition, the second pixel may receive light having a wavelength other than the infrared band as a peak wavelength.

The first pixel may correspond to the effective region AR, and the second pixel may correspond to the ineffective region IAR. For example, the first pixel may include the effective region AR, but the second pixel may include only the ineffective region IAR in which the effective region AR does not exist. For example, the light receiving element such as a photodiode may be positioned only in the first pixel and may not be in the second pixel. Hereinafter, a description will be made on the basis that the first pixel receives light but the second pixel does not receive light.

In addition, the first pixel may have only the effective region AR, or may also have both the effective region AR and the ineffective region IAR. In addition, the effective region SAR may exist at various positions within the first pixel. Accordingly, the center of the pixel may be different from the center of the effective region.

In the camera module according to the embodiment, the image sensor may control the optical member with the horizontal tilt with respect to a reference point (a) (see FIG.

34) where the tilt is not performed when the effective region AR and the ineffective region IAR are disposed in the checkerboard pattern as described above. The reference point is one point on a path of light incident on the image sensor when the optical member is not tilted.

In the embodiment, in the optical member (or filter), the light incident on the image sensor may move in the order of right (b), top (c), left (d), and bottom (e) with respect to the reference point (a) (see FIG. 34). At this time, the path of the incident light may move in various orders other than the above-described order.

According to this control, when the above-described image sensor composed of the pixel PX performs the tilting in the horizontal direction, it is possible to reduce the amount of movement compared to the tilting in the diagonal direction. For example, a movement distance from the reference point when performing the tilting in the horizontal direction may be smaller than a movement distance from the reference point when performing the tilting in the diagonal direction.

In addition, the pixel PX may include both the effective region AR and the ineffective region IAR. The effective region AR may be surrounded by the ineffective region IAR within one pixel PX. In other words, the effective region AR may be positioned at the center of the pixel PX, and the ineffective region IAR may be disposed outside the pixel PX.

In the camera module according to the embodiment, when the image sensor has a form in which the ineffective region IAR surrounds the effective region AR as described above, the image sensor may control the optical member with the horizontal tilting with respect to a reference point (a) (see FIG. 35) where the tilting is not performed. The reference point is one point on a path of light incident on the image sensor when the optical member is not tilted.

In the embodiment, in the optical member, the light incident on the image sensor may move in the order of the left and the top (b), the right and the top (c), the right and the bottom (d), and the left and the bottom (e) with respect to the reference point (a) (see FIG. 35). At this time, the path of the incident light may move in various orders other than the above-described order, and to this end, the order of the tilting in the diagonal direction may be controlled.

According to this control, when the above-described image sensor composed of the pixel PX is tilted in the diagonal direction, it is possible to reduce the amount of movement compared to the tilting in the horizontal direction. In other words, the movement distance from the reference point when performing the tilting in the diagonal direction may be smaller than the movement distance from the reference point when performing the tilting in the horizontal direction.

While the embodiments of the present invention have been described above with reference to the accompanying drawings, those skilled in the art to which the present invention pertains will understand that the present invention may be carried out in different specific forms without changing the technical spirit or the essential features. Accordingly, it should be understood that the above-described embodiments are illustrative and not restrictive in all respects.

The invention claimed is:
1. A camera module comprising:
a housing;
a lens module coupled to the housing;
a holder disposed in the housing;
an elastic member configured to connect the housing and the holder;
a magnet part and an optical member coupled to the holder; and
a coil part facing the magnet part,
wherein the holder includes a first protrusion extending in an optical axis direction and coupled to the elastic member,
wherein the elastic member includes a first coupling portion coupled to one surface of the first protrusion,
wherein the first protrusion includes a guide protrusion protruding from the one surface of the first protrusion in the optical axis direction,
wherein the guide protrusion is disposed more outwardly than the elastic member,
wherein the guide protrusion includes a shape corresponding to at least a part of an outer circumference of the first coupling portion, and
wherein the guide protrusion is disposed to be continuous with a sidewall of the holder.

2. The camera module of claim 1, wherein the holder further includes a base disposed below the first protrusion, wherein the sidewall is disposed between the base and the first protrusion.

3. The camera module of claim 2, further comprising a cover disposed on the housing, and including an upper plate and a side plate extending from the upper plate,
wherein the first protrusion is spaced part from the upper plate by a first distance in an initial state in which a current is not applied to the coil part, and
wherein the first distance satisfies Equation 1 below:

$$L \times \tan(0.75 \times \theta) \sim \text{first distance} \sim L \times \tan(1.25 \times \theta) \qquad [\text{Equation 1}]$$

(where L refers to a maximum length of the base, and θ refers to a maximum tilting angle of the holder in a diagonal direction).

4. The camera module of claim 2, wherein the first protrusion is formed on an upper portion of the sidewall,
wherein the base includes a base groove disposed on a lower surface, and
wherein the optical member is disposed in the base groove.

5. The camera module of claim 1, wherein the first protrusion further includes an extending protrusion extending in the optical axis direction, and
wherein the guide protrusion is disposed more outwardly than the extending protrusion.

6. The camera module of claim 5, wherein the first coupling portion includes a hole through which the extending protrusion passes.

7. The camera module of claim 5, wherein the extending protrusion includes a first extending protrusion and a second extending protrusion, and
wherein the first extending protrusion and the second extending protrusion are positioned in a diagonal direction.

8. The camera module of claim 1, wherein the housing includes an inner portion to which the lens module is coupled, an outer portion to which the coil part is coupled, and a connection portion configured to connect the inner portion and the outer portion.

9. The camera module of claim 8, wherein the outer portion includes a housing protrusion protruding upward, and
wherein the elastic member further includes a second coupling portion including a hole through which the housing protrusion passes.

10. The camera module of claim 4, wherein the base groove includes a coupling groove formed at a corner.

11. The camera module of claim 10, wherein the camera module further includes an adhesive member positioned in the coupling groove to couple the base and the optical member.

12. The camera module of claim 1, wherein the magnet part includes a first magnet, a second magnet disposed opposite to the first magnet, a third magnet, and a fourth magnet disposed opposite to the third magnet, and
wherein the coil part includes a first coil facing the first magnet, a second coil facing the second magnet, a third coil facing the third magnet, and a fourth coil facing the fourth magnet.

13. The camera module of claim 12, further comprising a controller configured to apply a current to each of the first coil, the second coil, the third coil, and the fourth coil,
wherein the first coil and the third coil have currents applied in different directions, and
wherein the second coil and the fourth coil have currents applied in different directions, and
wherein the optical member is tilted in a diagonal direction.

14. The camera module of claim 13, wherein the controller is further configured to apply a current to two coils facing each other among the first coil, the second coil, the third coil, and the fourth coil.

15. A camera device comprising:
a housing;
a lens module coupled to the housing;
a holder disposed between the housing and the lens module;
an elastic member configured to connect the housing and the holder;
a magnet part and an optical member coupled to the holder; and
a coil part facing the magnet part,
wherein the holder includes a first protrusion extending in an optical axis direction and coupled to the elastic member,
wherein the holder includes a second protrusion protruding downward,
wherein the first protrusion includes a guide protrusion protruding from one surface of the first protrusion in the optical axis direction, and
wherein the guide protrusion is disposed to be continuous with a sidewall of the holder.

16. The camera module of claim 15, wherein the holder further includes a base disposed between the first protrusion and the second protrusion, and wherein the second protrusion is disposed at a corner of the base.

17. The camera module of claim 16, wherein the base includes a base groove disposed on a lower surface.

18. The camera module of claim 17, wherein the base further includes a coupling groove disposed at the corner thereunder, and
wherein the optical member is disposed in the base groove and coupled to the base by an adhesive member.

19. A camera module including:
a housing;
a lens module coupled to the housing;
a holder disposed in the housing;
an elastic member configured to connect the housing and the holder;
a magnet part and an optical member coupled to the holder; and
a coil part facing the magnet part,
wherein the housing includes a housing protrusion disposed at an outer portion and protruding in an optical axis direction, and a guiding part disposed more outwardly than the elastic member and protruding in the optical axis direction,
wherein the elastic member includes a second coupling portion coupled to the housing protrusion,
wherein the guiding part includes a shape corresponding to at least a part of an outer circumference of the second coupling portion, and
wherein the housing further includes an inner portion to which the lens module is coupled.

20. The camera module of claim 19, wherein the housing includes the outer portion to which the coil part is coupled, and a connection portion configured to connect the inner portion and the outer portion, and further includes the housing protrusion protruding upward from the outer portion,
wherein the guiding part is disposed on the outer portion and disposed more outwardly than the housing protrusion, and
wherein the elastic member further includes the second coupling portion including a hole through which the housing protrusion passes.

* * * * *